(12) United States Patent
Jeevarajan et al.

(10) Patent No.: US 12,344,447 B2
(45) Date of Patent: Jul. 1, 2025

(54) CONTAINER FOR HOLDING BATTERIES OR CELLS

(71) Applicant: Underwriters Laboratories Inc., Northbrook, IL (US)

(72) Inventors: Judith Jeevarajan, League City, TX (US); Daniel Juarez-Robles, League City, TX (US); Tapesh Joshi, League City, TX (US)

(73) Assignee: Underwriters Laboratories Inc., Northbrook, IL (US)

( * ) Notice: Subject to any disclaimer, the term of this patent is extended or adjusted under 35 U.S.C. 154(b) by 253 days.

(21) Appl. No.: 17/553,376

(22) Filed: Dec. 16, 2021

(65) Prior Publication Data

US 2023/0192369 A1 Jun. 22, 2023

(51) Int. Cl.
*B65D 51/16* (2006.01)
*B65D 1/24* (2006.01)
*H01M 50/342* (2021.01)

(52) U.S. Cl.
CPC ........... *B65D 51/1622* (2013.01); *B65D 1/24* (2013.01); *H01M 50/3425* (2021.01)

(58) Field of Classification Search
CPC . B65D 51/1622; B65D 1/24; H01M 50/3425; H01M 50/367; H01M 50/317; H01M 50/325
See application file for complete search history.

(56) References Cited

U.S. PATENT DOCUMENTS

| | | | |
|---|---|---|---|
| 2,578,107 A | 12/1951 | Thacker et al. | |
| 3,531,327 A | 9/1970 | Moos | |
| 4,207,387 A * | 6/1980 | Jutte | H01M 50/367 |
| | | | 429/88 |
| 4,891,270 A | 1/1990 | Jergl et al. | |

(Continued)

FOREIGN PATENT DOCUMENTS

| | | |
|---|---|---|
| CN | 110364644 A | 10/2019 |
| EP | 2475028 A1 | 7/2012 |

(Continued)

OTHER PUBLICATIONS

Jun. 30, 2023—(WO) International Search Report and Written Opinion—App PCT/US2022/081684.

(Continued)

*Primary Examiner* — Anthony D Stashick
*Assistant Examiner* — L Kmet
(74) *Attorney, Agent, or Firm* — Banner & Witcoff, Ltd.

(57) ABSTRACT

A container includes a body having a top and a bottom, with a plurality of receptacles defined within the body and configured to receive an electrochemical cell or battery therein, with each receptacle having an open first end located at the top of the body. The body further includes internal walls separating the receptacles laterally from each other. A cover is removably positioned to cover the top of the body, such that the cover and the body together define a plurality of sides extending between a top wall of the cover and the bottom of the body. A head space is defined beneath an underside of the cover and above the first ends of the receptacles. A vent extends through a first side, and the vent is in communication with the head space to permit gases within the head space to exit.

29 Claims, 19 Drawing Sheets

(56) References Cited

U.S. PATENT DOCUMENTS

| | | |
|---|---|---|
| 5,160,025 A | 11/1992 | Greenawald |
| 8,475,954 B2 | 7/2013 | Ijaz et al. |
| 8,541,126 B2 | 9/2013 | Hermann et al. |
| 8,557,416 B2 | 10/2013 | Mardall et al. |
| 8,785,026 B2 | 7/2014 | Hu et al. |
| 9,406,917 B2 | 8/2016 | Petzinger |
| 9,537,130 B2 | 1/2017 | Yoon |
| 9,853,267 B2 | 12/2017 | Page et al. |
| 10,243,186 B2 | 3/2019 | Kruger |
| 10,584,829 B2 | 3/2020 | Gehlhausen et al. |
| 10,790,489 B2 | 9/2020 | Lampe-Onnerud et al. |
| 2005/0147874 A1 | 7/2005 | Andersen et al. |
| 2010/0255359 A1 | 10/2010 | Hirakawa et al. |
| 2010/0330404 A1* | 12/2010 | Nishino .............. H01M 50/213 429/82 |
| 2019/0097204 A1 | 3/2019 | Liposky et al. |
| 2019/0305392 A1 | 10/2019 | Day et al. |
| 2020/0403195 A1 | 12/2020 | Mo et al. |

FOREIGN PATENT DOCUMENTS

| | | |
|---|---|---|
| WO | 2013001585 A1 | 1/2013 |
| WO | 2013125997 A1 | 8/2013 |
| WO | 2017106349 A1 | 6/2017 |
| WO | 201928516 A1 | 2/2019 |
| WO | 2020110093 A1 | 6/2020 |

OTHER PUBLICATIONS

Lopez, et al., "Experimental Analysis of Thermal Runaway and Propagation in Lithium-ion Battery Modules", 162 (9), A1905-A1915, 2015; <https://iopscience.iop.org/article/10.1149/2.0921509jes/pdf>.

Zarges website; product listing for BatterySafe Lithium Ion Batteries—Specialty Cases; https://zargesusa.com/products/cases/specialty/batterysafe/; 4 pages; downloaded Jul. 26, 2021.

LithiumSafe website; product listing for Lithium battery storage box for thermal runaway protection; http://www.lithiumsafe.com/lithium-battery-storage-box/; 3 pages; downloaded Jul. 26, 2021.

* cited by examiner

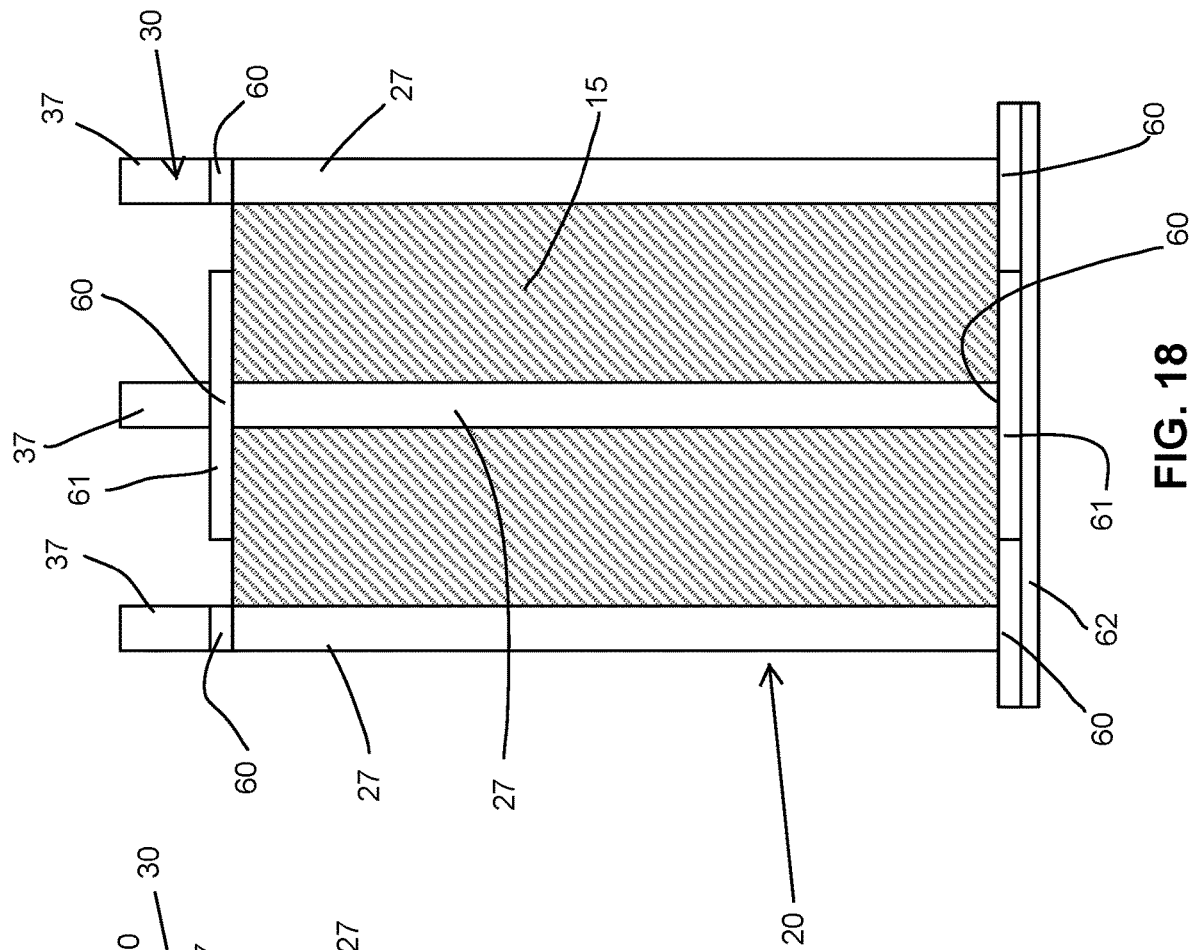
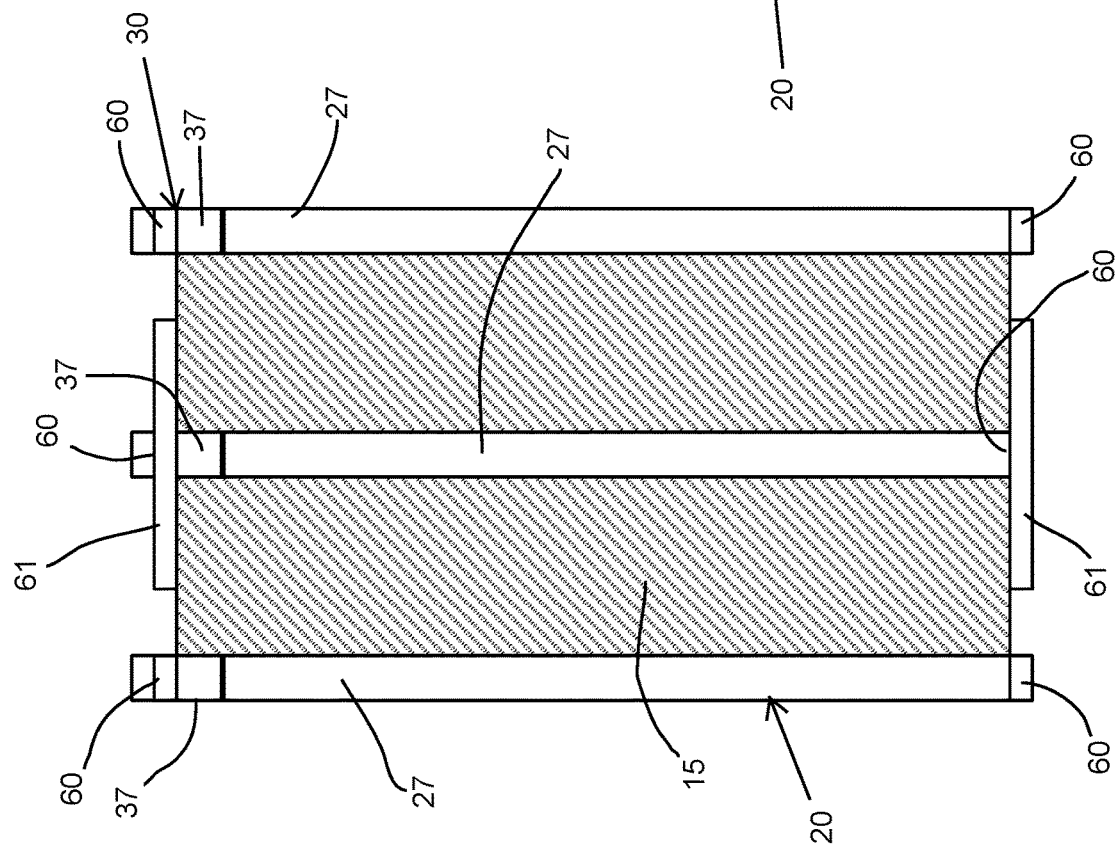

CONTAINER FOR HOLDING BATTERIES OR CELLS

FIELD OF THE INVENTION

This disclosure relates to containers for storage and/or transportation of electrochemical cells or batteries, and more specifically to containers that can avoid propagation of thermal runaway and resist contamination of material between cells or batteries within the container.

BACKGROUND

Electrochemical cells and batteries are known to occasionally go into thermal runaway during shipping or storage. Thermal runaway can not only destroy the battery or cell undergoing thermal runaway, but can also propagate to other batteries or cells stored nearby. One mechanism by which this can occur is propagation of heat and/or fire from the battery or cell undergoing thermal runaway to surrounding batteries or cells. Another such mechanism is impingement of material from the battery or cell undergoing thermal runaway onto surrounding batteries or cells, such as electrolyte leakage or emitted combustible vapors. This is particularly dangerous with high-power electrochemical cells or batteries.

Lithium-based cells and batteries have restrictions for shipment in order to reduce the danger of thermal runaway and the propagation of the same. For example, lithium-ion rechargeable cells and batteries are limited to no higher than a 30% state of charge (SOC) for transportation by air. As another example, lithium primary (non-rechargeable) cells and batteries are not permitted to be shipped in passenger aircraft. However, for lithium ion cells, even at 30% SOC, thermal runaway and propagation of the same can occur. Avoiding propagation of thermal runway in lithium-ion cells, as well as other types of batteries and cells, can improve safety and product integrity during shipment, storage, and other situations.

The present disclosure is provided to address this need and other needs in existing containers for storage and transport of electrochemical cells and batteries. A full discussion of the features and advantages of the present invention is deferred to the following detailed description, which proceeds with reference to the accompanying drawings.

BRIEF SUMMARY

Aspects of the disclosure relate to a container including a body having a top and a bottom, with a plurality of receptacles defined within the body, each receptacle being configured to receive an electrochemical cell or battery therein, and each receptacle having a first end and a second end and extending vertically between the first and second ends. The first end is located at the top of the body and is open to receive insertion of the cell or battery, and the body further includes a plurality of internal walls separating the receptacles laterally from each other. A cover is removably positioned to cover the top of the body, such that the cover and the body together define a plurality of sides extending between a top wall of the cover and the bottom of the body. A head space is defined beneath an underside of the cover and above the first ends of the plurality of receptacles, and the body and the cover are formed of a same material. A vent extends through a first side of the plurality of sides, and the vent is in communication with the head space to permit gases within the head space to exit through the vent.

According to one aspect, the material of the cover and the body is a polymeric material having a thermal conductivity of at least 0.6 W/m*K.

According to a further aspect, the cover and the body are each formed from a single, integral piece of the material.

According to yet another aspect, the cover further includes a plurality of passages extending upward from a bottom side of the cover to the head space, wherein the plurality of passages of the cover are positioned above the plurality of receptacles, such that a portion of each cell or battery is configured to be received in one of the passages. The head space is defined above the plurality of passages, such that the head space is in communication with the plurality of receptacles via the plurality of passages.

According to a still further aspect, a plurality of seals are positioned between the first ends of the plurality of receptacles and the head space to seal the plurality of receptacles from the head space, and the plurality of seals are breakable and/or selectively permeable to permit selective escape of matter from one receptacle while resisting the matter from infiltrating other receptacles.

According to an additional aspect, each of the plurality of receptacles extends to the bottom of the body, such that the second end of each receptacle is open, or alternatively, the second end of each of the plurality of receptacles is a closed end located within the body.

According to another aspect, the cover and the body together define a rectangular shape having the first side, a second side, a third side, and a fourth side, and the head space is closed on the second side, the third side, and the fourth side.

Additional aspects of the disclosure relate to a container including a body having a top and a bottom, and a cover removably positioned to cover the top of the body, such that the cover and the body together define a plurality of sides extending between a top wall of the cover and the bottom of the body. The top wall of the cover further an underside, and the cover further has a bottom portion located below the underside, the bottom portion having a plurality of passages extending upward from a bottom side of the cover through the bottom portion. A plurality of receptacles are defined within the body, each receptacle being configured to receive an electrochemical cell or battery therein, and each receptacle having a first end and a second end and extending vertically between the first and second ends. The first end of each receptacle is located at the top of the body and is open to receive insertion of the cell or battery. The body further includes a plurality of internal walls separating the receptacles laterally from each other, and the plurality of passages of the cover are positioned above the plurality of receptacles and are continuous with the receptacles, such that a portion of each cell or battery is configured to be received in one of the passages. A vent extends through a first side of the plurality of sides, and a head space is defined beneath the underside of the cover and above the bottom portion of the cover, such that the head space is in communication with the plurality of receptacles via the plurality of passages. The vent is in communication with the head space to permit gases within the head space to exit through the vent.

According to one aspect, the bottom side of the cover engages the top of the body to separate the receptacles and passages from each other.

According to another aspect, the plurality of passages and the plurality of receptacles have cross-sectional shapes and cross-sectional sizes that are the same.

According to a further aspect, the vent is defined entirely within a wall of the cover and is located above the bottom portion of the cover.

According to yet another aspect, a height of the cover from the bottom side to the top wall is greater than a height of the body from the bottom to the top, and the plurality of passages have greater heights than the plurality of receptacles.

According to a still further aspect, the cover and the body together define a rectangular shape having the first side, a second side, a third side, and a fourth side, and the head space is closed on the second side, the third side, and the fourth side.

According to an additional aspect, a plurality of seals are positioned between the first ends of the plurality of receptacles and the head space to seal the plurality of receptacles from the head space, and the plurality of seals are breakable and/or selectively permeable to permit selective escape of matter from one receptacle while resisting the matter from infiltrating other receptacles. In one configuration, the plurality of seals are connected to the bottom portion of the cover and seal the plurality of passages to seal the plurality of receptacles from the head space.

According to another aspect, a plurality of slots are provided in at least one of the bottom portion of the cover and the body, and the slots are configured to interconnect the electrochemical batteries or cells in adjacent receptacles.

Further aspects of the disclosure relate to a container including a body having a top and a bottom, with a plurality of receptacles defined within the body, each receptacle being configured to receive an electrochemical cell or battery therein. Each receptacle has a first end and a second end and extends vertically between the first and second ends, where the first end is located at the top of the body and is open to receive insertion of the electrochemical cell or battery. The body further includes a plurality of internal walls separating the receptacles laterally from each other. A cover is removably positioned to cover the top of the body, such that the cover and the body together define a plurality of sides extending between a top wall of the cover and the bottom of the body, and a head space is defined beneath an underside of the cover and above the first ends of the plurality of receptacles. A vent extends through a first side of the plurality of sides, and the vent is in communication with the head space to permit gases within the head space to exit through the vent. A plurality of seals are positioned between the first ends of the plurality of receptacles and the head space to seal the plurality of receptacles from the head space. The plurality of seals are breakable and/or selectively permeable to permit selective escape of matter from one receptacle while resisting the matter from infiltrating other receptacles.

According to one aspect, the cover further includes a plurality of passages extending upward from a bottom side of the cover to the head space, and the plurality of passages of the cover are positioned above the plurality of receptacles, such that a portion of each cell or battery is configured to be received in one of the passages. The head space is defined above the plurality of passages, such that the head space is in communication with the plurality of receptacles via the plurality of passages. In one configuration, the plurality of seals are connected to the cover and seal the plurality of passages to seal the plurality of receptacles from the head space.

According to another aspect, the cover and the body together define a rectangular shape having the first side, a second side, a third side, and a fourth side, and the head space is closed on the second side, the third side, and the fourth side.

According to a further aspect, each of the plurality of receptacles extends to the bottom of the body, such that the second end of each receptacle is open, or alternatively, the second end of each of the plurality of receptacles is a closed end located within the body.

According to yet another aspect, the body and the cover are formed of a polymeric material having a thermal conductivity of at least 0.6 W/m*K.

Other aspects of the disclosure relate to a method of manufacturing a container as described herein, including casting or injection molding a body from a polymeric material, and creating a plurality of receptacles in the body using a material removal technique. Such a method may additionally or alternately include casting or injection molding a cover from a polymeric material, and creating a plurality of passages in the cover using a material removal technique. The body and the cover may be cast or molded from the same material.

Other features and advantages of the disclosure will be apparent from the following description taken in conjunction with the attached drawings.

BRIEF DESCRIPTION OF THE DRAWINGS

To allow for a more full understanding of the present disclosure, it will now be described by way of example, with reference to the accompanying drawings in which:

FIG. 17 is a cross-sectional view of a portion of another embodiment of a container according to aspects of the disclosure;

FIG. 18 is a cross-sectional view of a portion of another embodiment of a container according to aspects of the disclosure.

DETAILED DESCRIPTION

Figure 1:
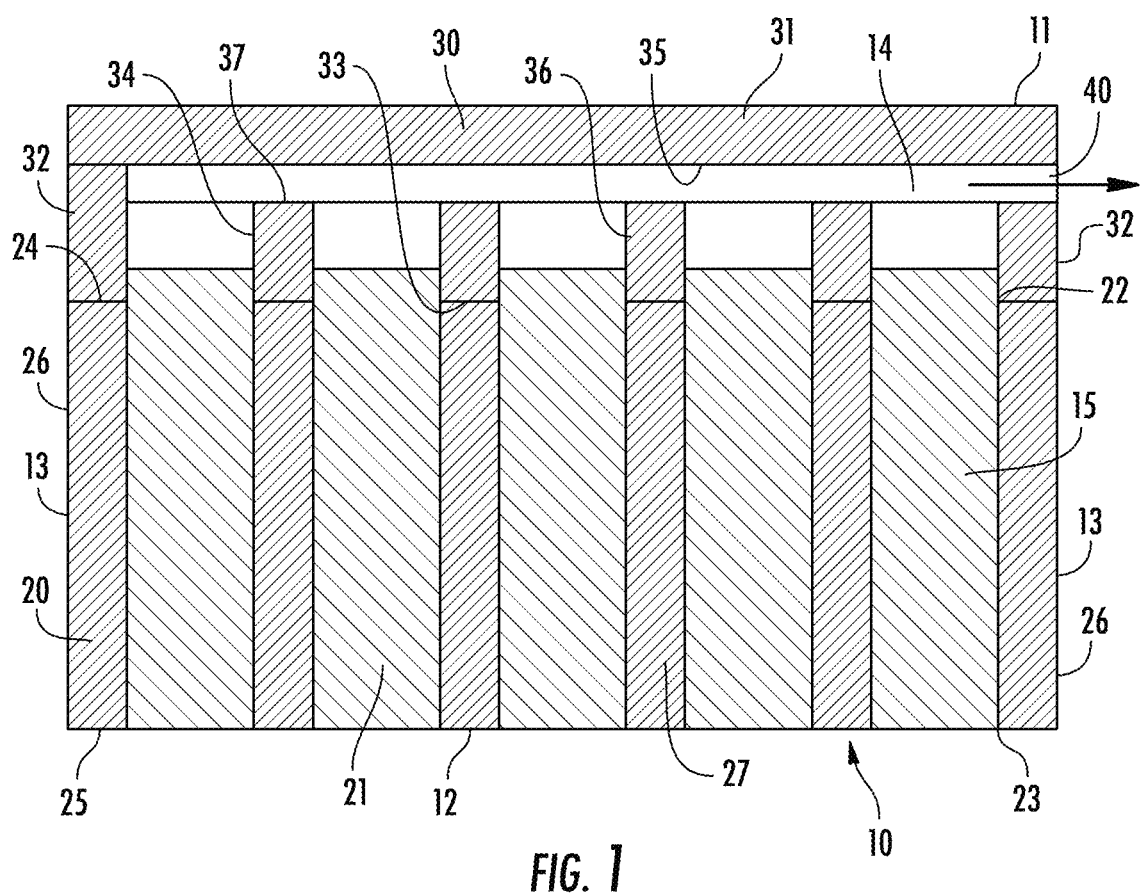
FIG. 1 is a cross-sectional view of one embodiment of a container according to aspects of the disclosure.

While this invention is susceptible of embodiments in many different forms, there are shown in the drawings and will herein be described in detail example embodiments of the invention with the understanding that the present disclosure is to be considered as an exemplification of the principles of the invention and is not intended to limit the broad aspect of the invention to the embodiments illustrated. In the following description of various example structures according to the invention, reference is made to the accompanying drawings, which form a part hereof, and in which are shown by way of illustration various example devices, systems, and environments in which aspects of the invention may be practiced. It is to be understood that other specific arrangements of parts, example devices, systems, and environments may be utilized and structural and functional modifications may be made without departing from the scope of the present invention.

General aspects of the present disclosure relate to a container 10 for holding one or more electrochemical batteries or cells 15 (which may be collectively referred to as "power devices" herein) that includes a body or base 20, a cover 30, and one or more vents 40 configured to permit gases (which may include vapors and aerosols) to exit the container 10. Referring first to FIGS. 1-5, one embodiment of a container 10 is shown, which includes a body 20 and a cover 30. FIGS. 6-19 illustrate additional embodiments of containers 10 described herein.

Figure 2:
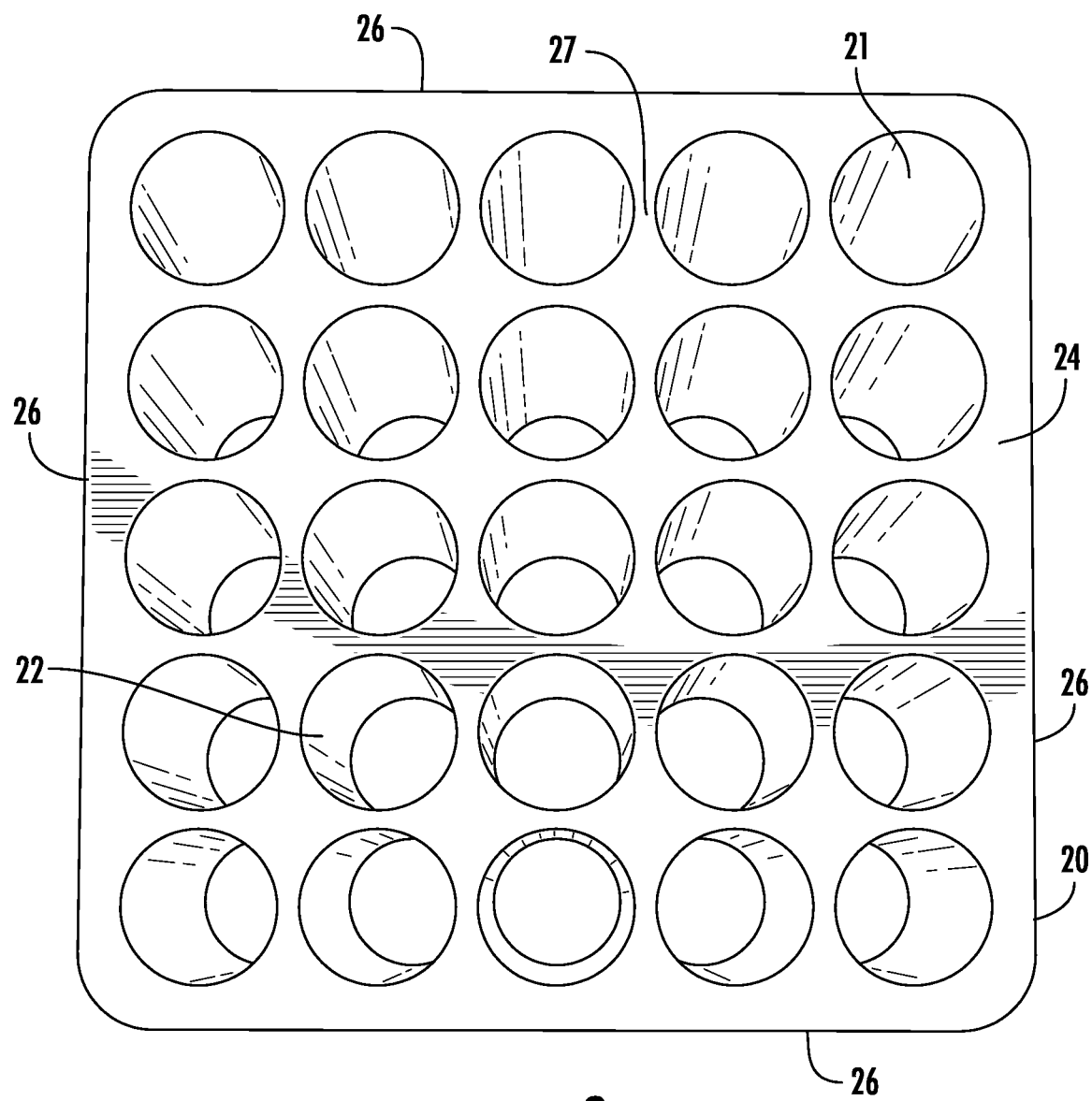
FIG. 2 is a top view of a body of the container of FIG. 1.
Figure 3:
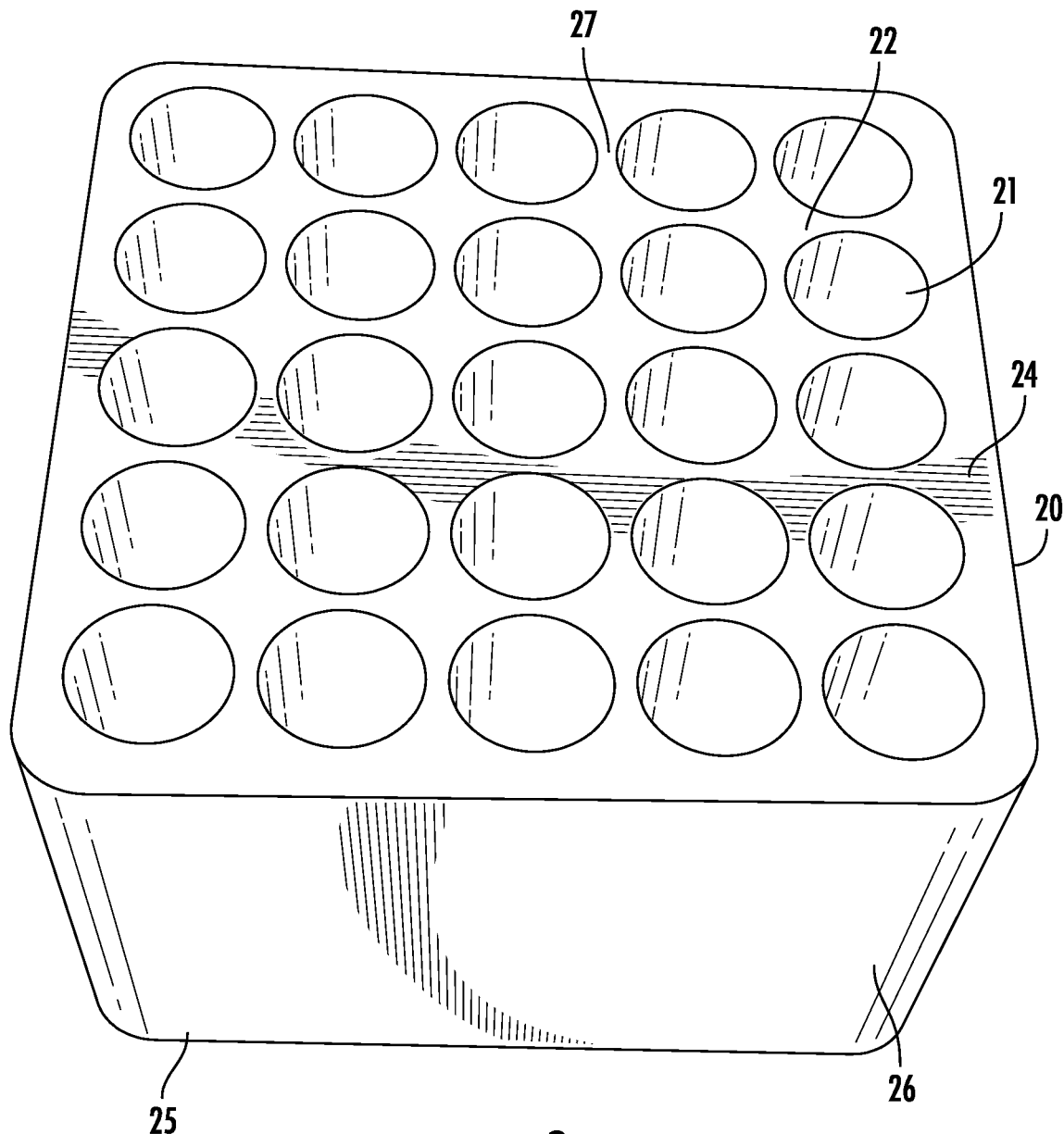
FIG. 3 is a top perspective view of the body of the container of FIG. 1.
Figure 4:
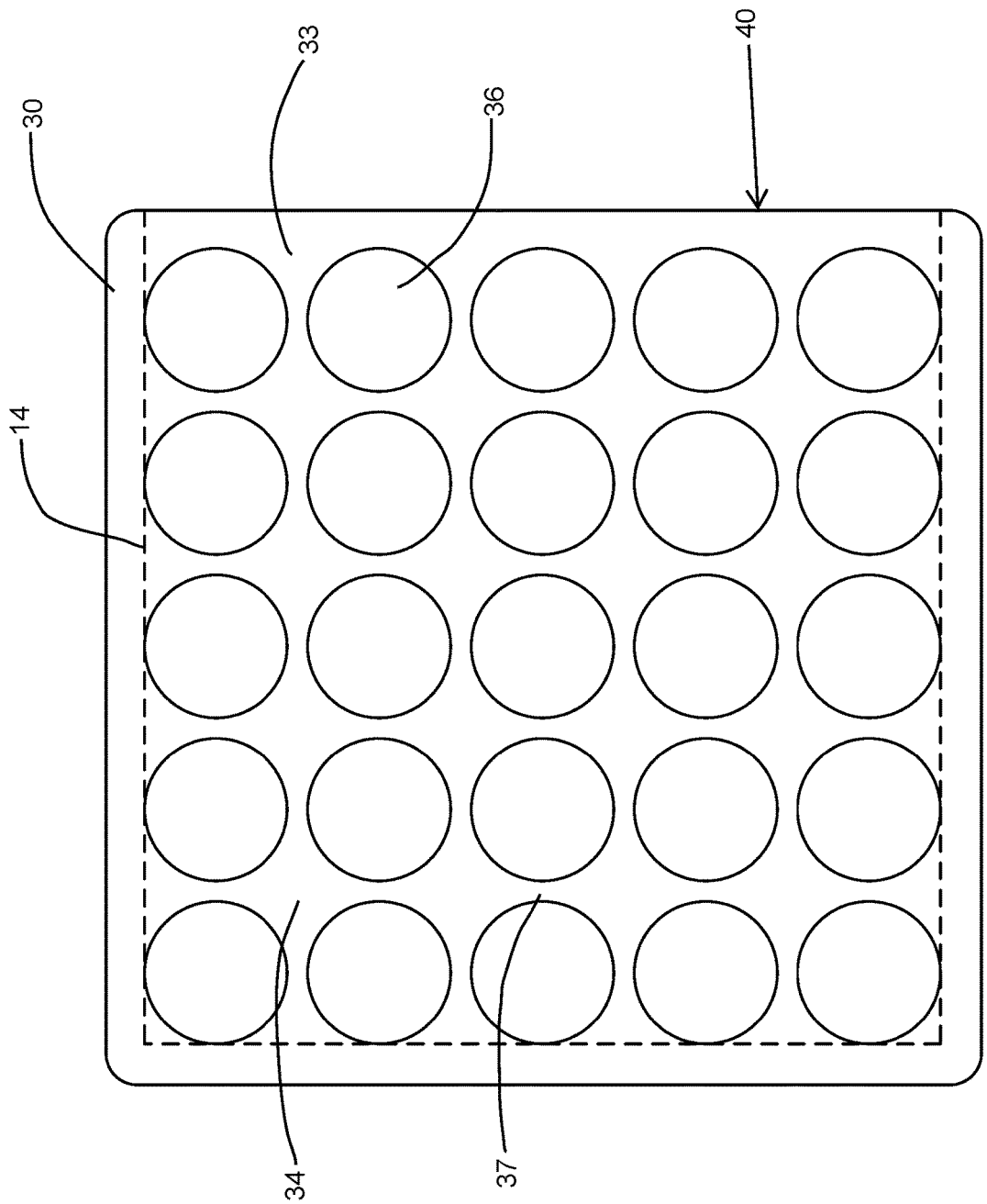
FIG. 4 is a bottom view of a cover of the container of FIG. 1.

The body 20 in the embodiment of FIGS. 1-5 is in the form of a solid square or rectangular block having a top 24, a bottom 25, and a plurality of sides 26 extending between the top 24 and the bottom 25, with a plurality of receptacles 21 defined therein. It is noted that the term "rectangular" as used herein encompasses square shapes, as well as shapes with rounded corners and flat sides 26 as shown in FIGS. 2-4. The top 24, bottom 25, and sides 26 of the body 20 in FIGS. 1-5 are all flat.

Figure 8:
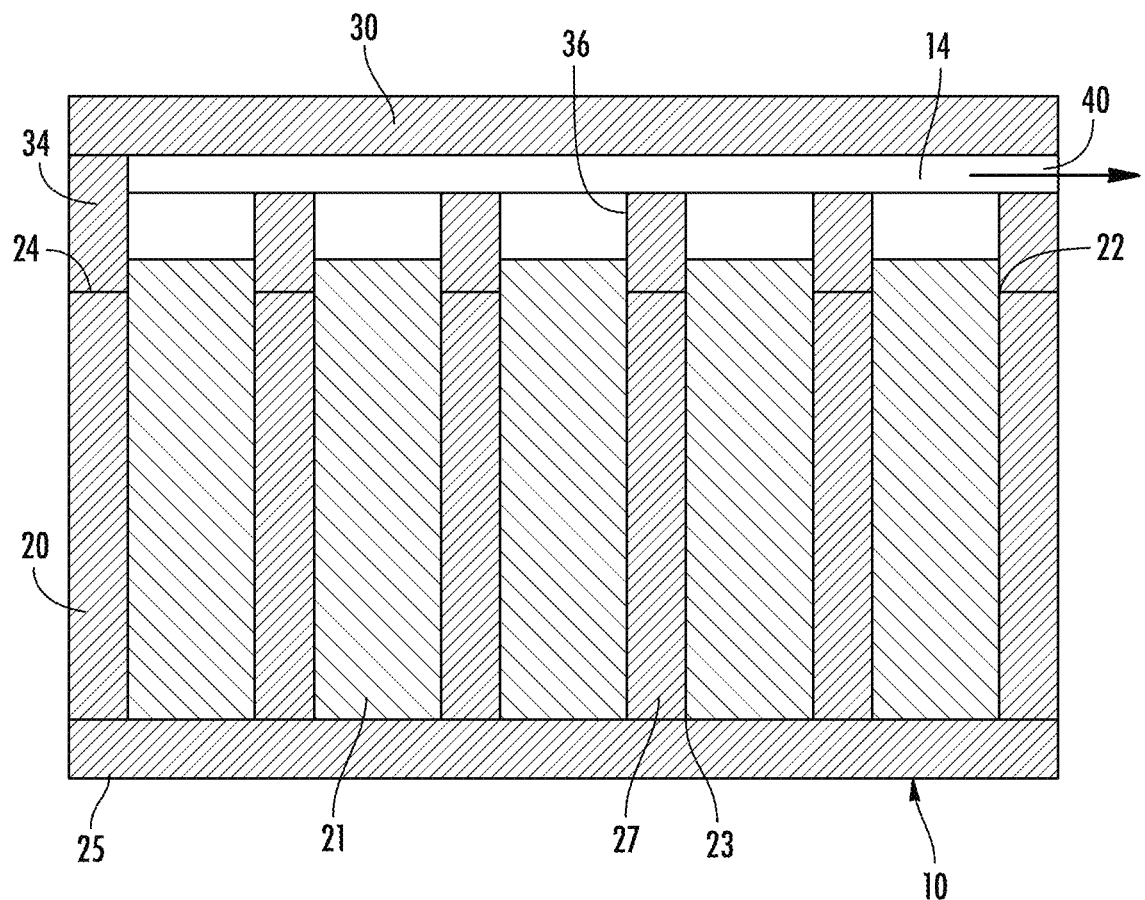
FIG. 8 is a cross-sectional view of another embodiment of a container according to aspects of the disclosure.
Figure 12A:
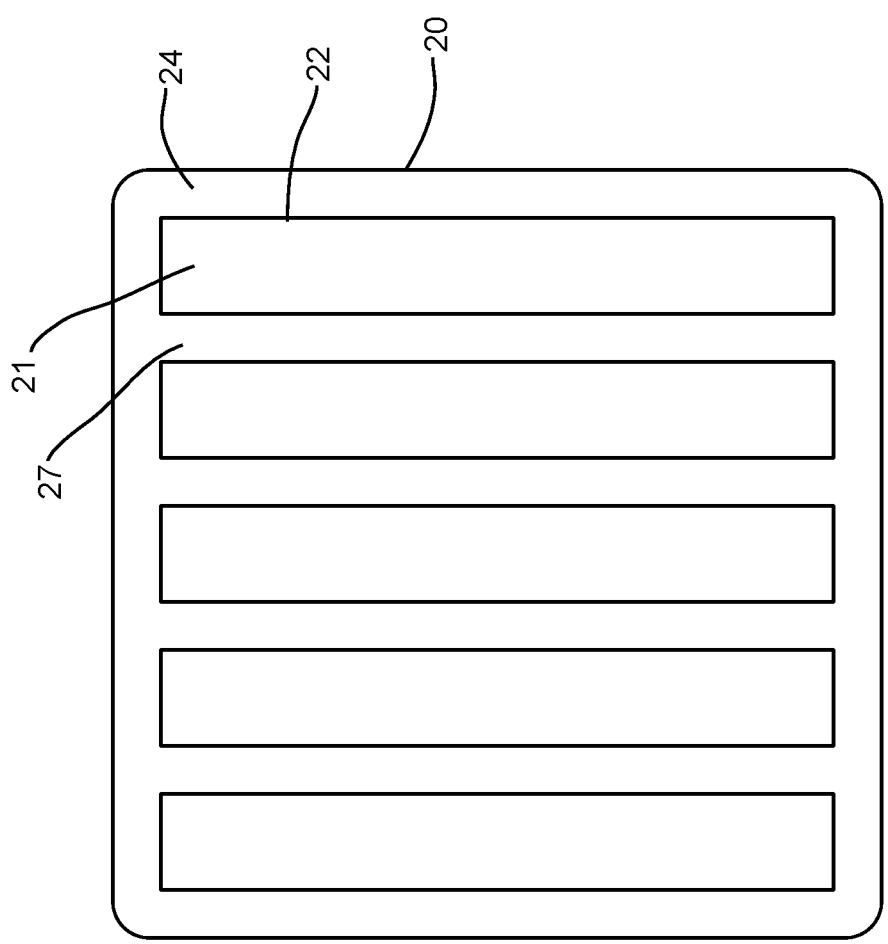
FIG. 12A is a top view of another embodiment of a body for a container according to aspects of the disclosure.
Figure 12B:
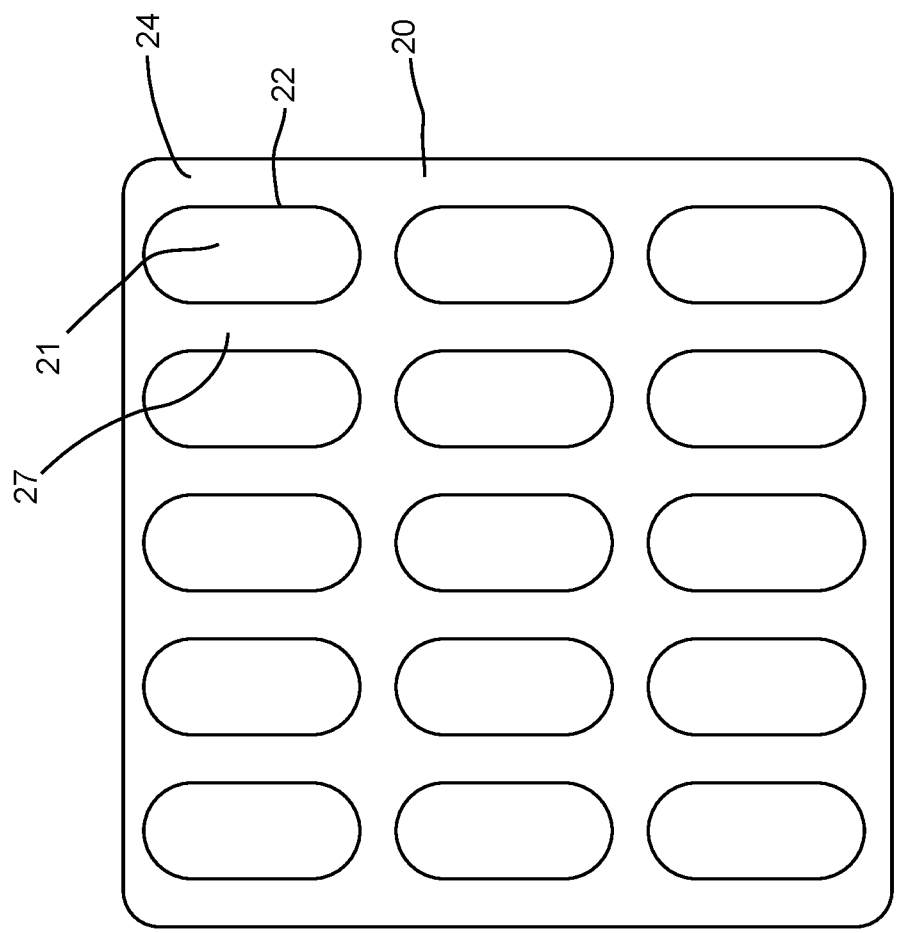
FIG. 12B is a top view of another embodiment of a body for a container according to aspects of the disclosure.

Each receptacle 21 is configured to receive one or more electrochemical batteries or cells 15 therein, as shown in FIG. 1. The receptacles 21 in this embodiment are in the form of vertically elongated cavities having circular cross-sectional shapes, with each receptacle 21 configured to hold a single cylindrical battery or cell 15. Other shapes and configurations of receptacles 21 may be used in other embodiments, such as in the body 20 in FIGS. 12A-B described herein. It is understood that the receptacles 21 may be shaped and dimensioned to hold a specific type of battery or cell 15. For example, FIG. 12A illustrates another embodiment of a body 20 that includes receptacles 21 with elongated rectangular shapes. As another example, FIG. 12B illustrates another embodiment of a body 20 that includes receptacles 21 with elongated obround or elliptical shapes. Each receptacle 21 has a first end 22 and a second end 23 and extends vertically between the first and second ends 22, 23. The first ends 22 of the receptacles 21 in FIGS. 1-5 extend to the top 24 of the body 20 and are open to receive insertion of the battery or cell 15. The second ends 23 of the receptacles 21 in FIGS. 1-5 extend to the bottom 25 of the body 20 and are also open, such that the receptacles 21 extend completely through the body 20 vertically. In other embodiments, the second ends 23 of the receptacles 21 may be closed ends that terminate within the body 20, as shown in FIG. 8 and described herein. The body 20 also has a plurality of internal walls 27 that separate the receptacles 21 laterally from each other. The minimum thicknesses of the internal walls 27 is at least 2 mm in one embodiment, or at least 4 mm in another embodiment. This thickness is sufficient to provide the walls 27 with good ability to absorb heat without facilitating heat transfer to surrounding receptacles 21.

Figure 14:
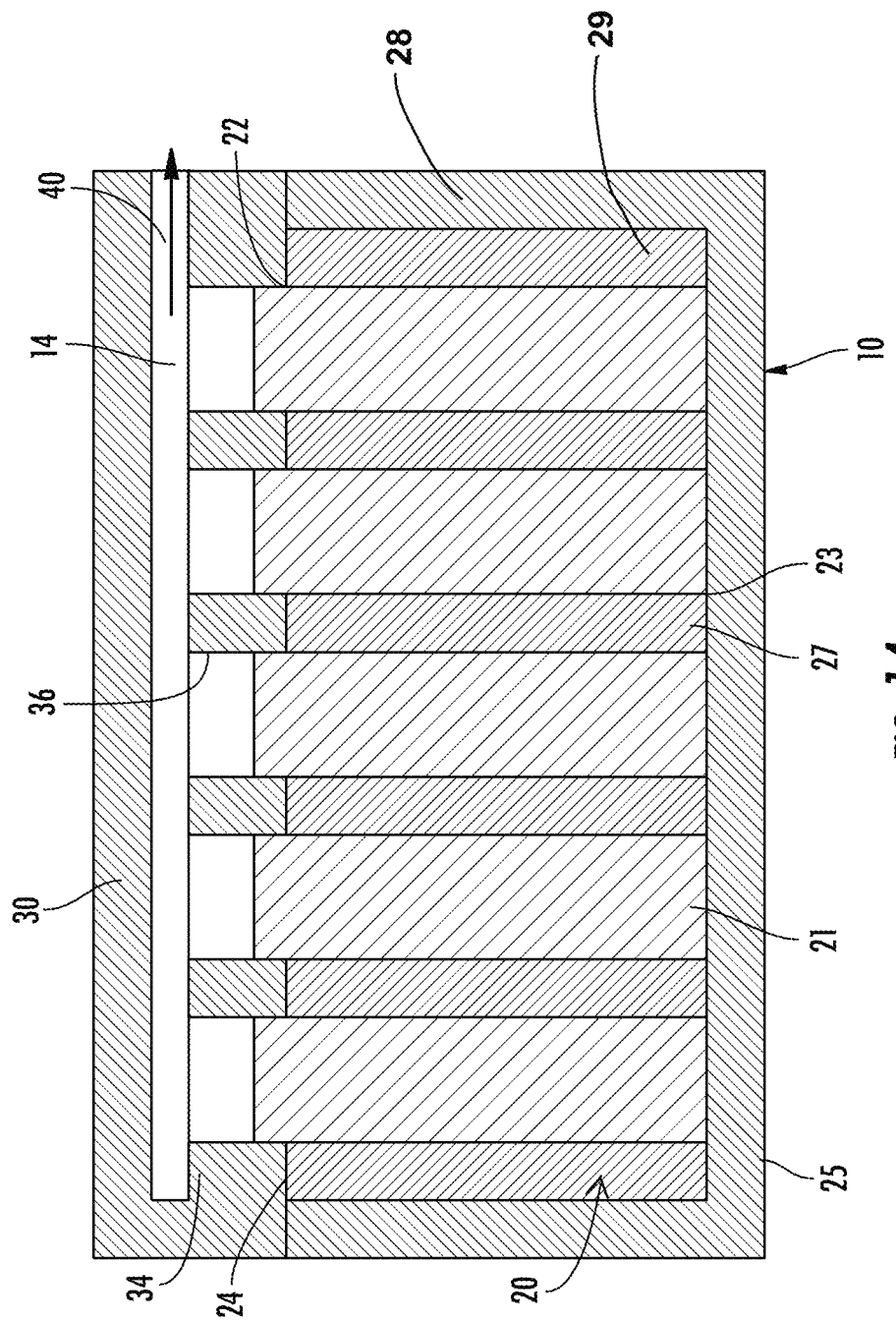
FIG. 14 is a cross-sectional view of another embodiment of a container according to aspects of the disclosure.
Figure 15:
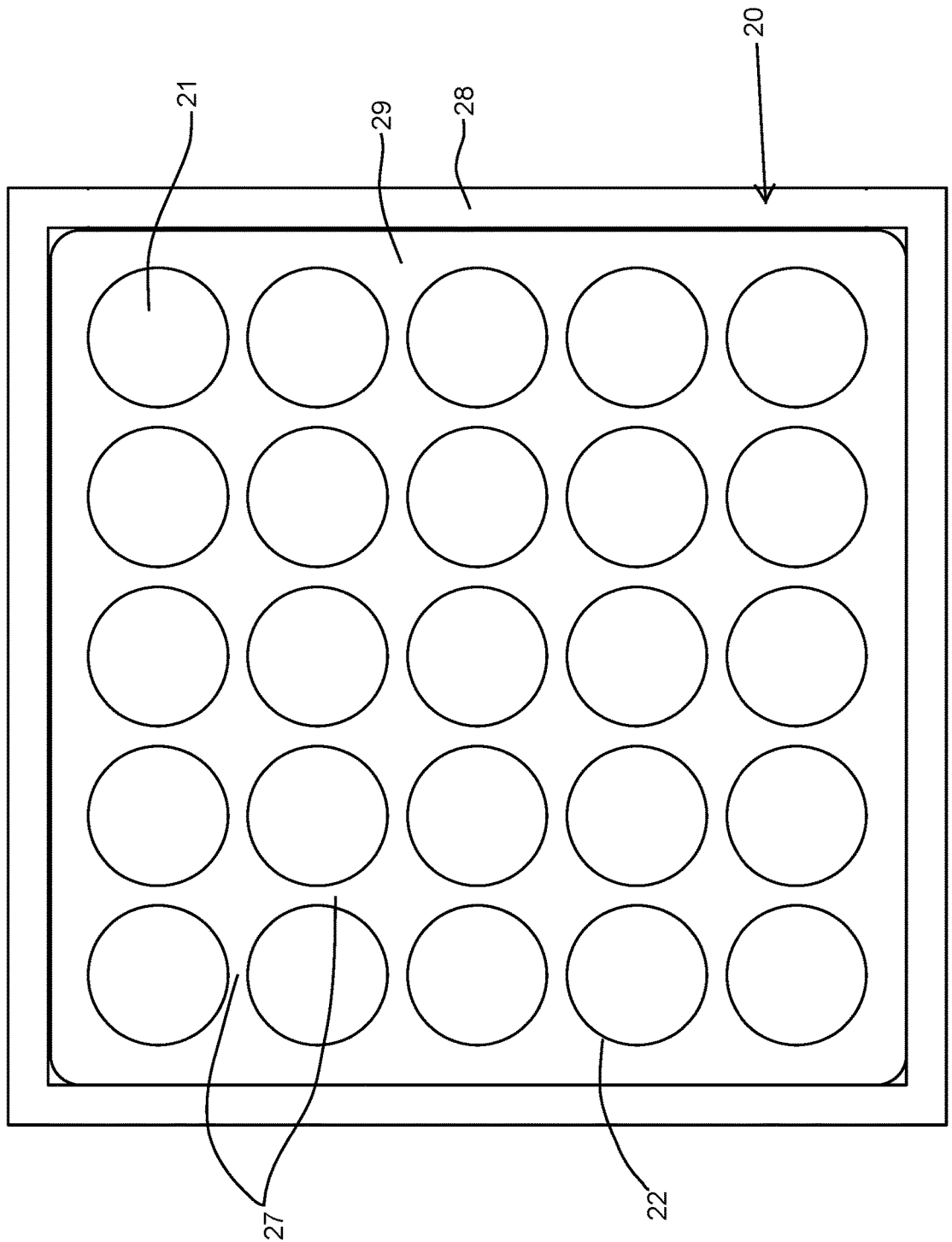
FIG. 15 is a top view of a body of the container of FIG. 14.
Figure 16:
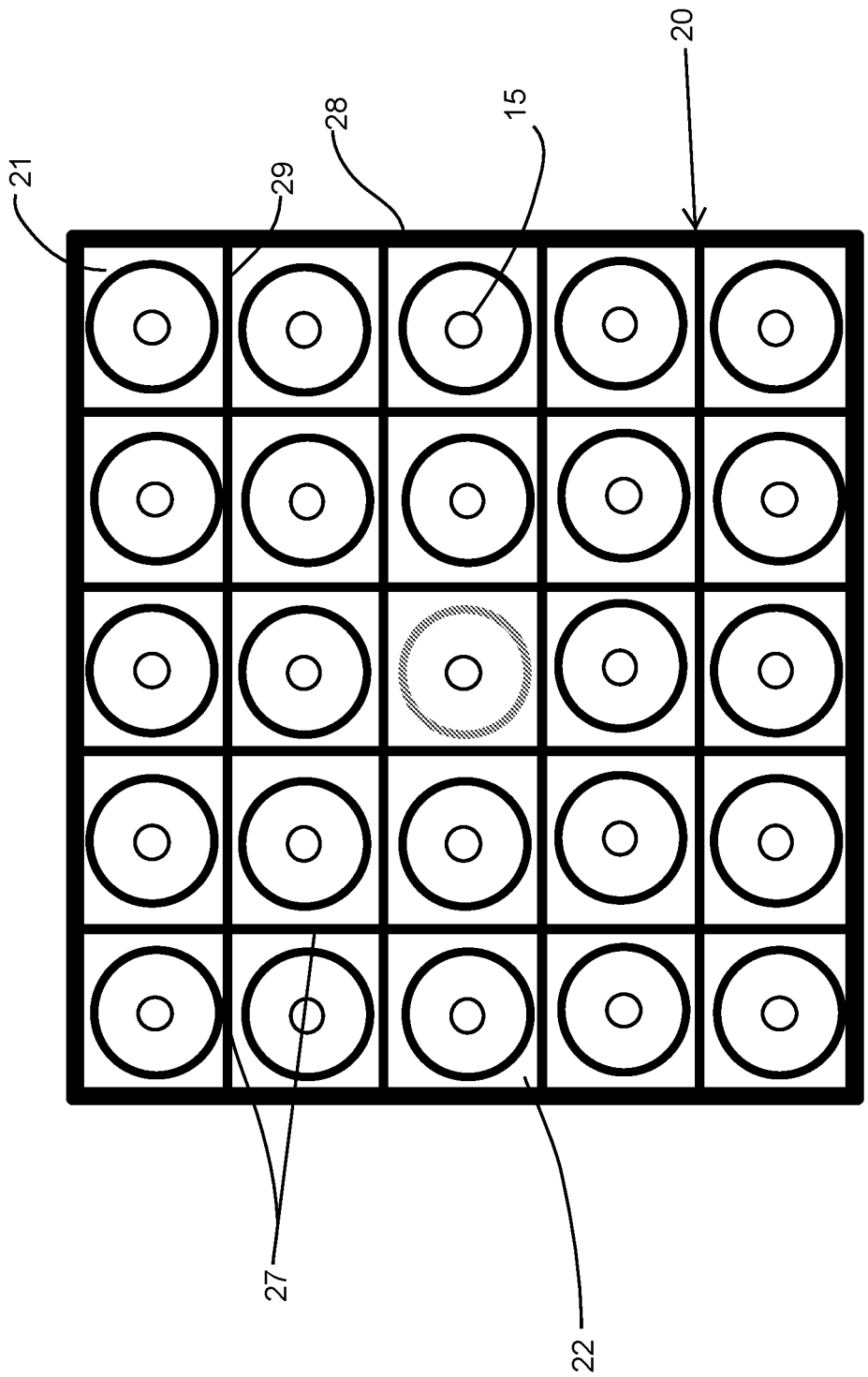
FIG. 16 is a top view of another embodiment of a body for a container according to aspects of the disclosure.

In another embodiment, the body 20 may be formed of multiple pieces, rather than a single piece. For example, FIGS. 14-16 illustrate embodiments where the body 20 is formed of a shell 28 with one or more inserts 29 contained within the shell 28 to define the receptacles 21. It is understood that such an insert or inserts 29 will have a plurality of internal walls 27 that separate the receptacles 21 laterally from each other, as similarly described herein. The internal walls 27 may be configured as similarly described herein, such as having minimum thicknesses of at least 2 mm in one embodiment, or at least 4 mm in another embodiment. The shell 28 and/or the insert(s) 29 may be formed of any materials described herein for forming the body 20, and may be made from the same material in one embodiment. FIGS. 14-15 illustrate an embodiment of a container 10 where the body 20 includes a shell 28 in the form of a hollow rectangular or square box with an open top, with a single-piece insert 29 inserted within the shell 28 to define the receptacles 21. The insert 29 in FIGS. 14-15 is substantially similar in structure to the body 20 illustrated in FIGS. 2-3, and the insert 29 fully defines the peripheries of all of the receptacles 21. FIG. 16 illustrates another embodiment of a container 10 where the body 20 includes a shell 28 in the form of a hollow rectangular or square box with an open top, with a single-piece insert 29 inserted within the shell 28 to define the receptacles 21. The insert 29 in FIG. 16 includes a plurality of perpendicular internal walls 27 arranged in a grid to define receptacles 21 having rectangular or square shapes. The insert 29 in FIG. 16 has open sides as well, so that the receptacles 21 around the periphery of the insert 29 are partially defines by the walls of the shell 28. It is understood that the insert 29 of FIGS. 14-15 or the insert 29 of FIG. 16 may be formed as multiple pieces in one embodiment.

The cover 30 in FIGS. 1-5 has the same square or rectangular peripheral shape as the body 20 and includes a top wall 31, four walls 32 depending from the top wall 31, and a bottom side 33 opposite the top wall 31. The cover 30 is configured to rest on the top 24 of the body 20 to cover the open first ends 22 of the receptacles 21. The container 10 formed by the cover 30 and the body 20 in combination has a top 11 formed by the top wall 31 of the cover 30, a bottom 12 formed by the bottom 25 of the body 20, and a plurality of sides 13 formed by the combinations of the sides 26 of the body 20 and the walls 32 of the cover 30. The cover 30, alone or in combination with the body 20, also defines a head space 14 within the container 10, below the underside 35 of the top wall 31 of the cover 30 and above the first ends 22 of the receptacles 21. The head space 14 is in communication with the receptacles 21 to provide space for gases and other matter to exit the receptacles 21, e.g., due to thermal runaway or another reaction. The containers 10 shown herein have a single head space 14 located above the receptacles 21, although in other embodiments, the cover 30, alone or in combination with the body 20, may define multiple head spaces 14 above different sections of the body 20.

The cover 30 in FIGS. 1-5 includes a bottom portion 34 that is spaced from the top wall 31 to define the head space 14 between the bottom portion 34 and the underside 35 of the top wall 31. In another embodiment, the cover 30 may not include a bottom portion 34, and the head space 14 may be defined between the top 24 of the body 20 and the underside 35 of the top wall 31. The bottom portion 34 in FIGS. 1-5 forms the bottom side 33 of the cover 30 and rests upon the top 24 of the body 20 when assembled. In this embodiment, the cover 30 has a plurality of passages 36 extending through the bottom portion 34, from the bottom side 33 to the head space 14. The passages 36 of the cover 30 may have the same sizes, shapes, and arrangement as the receptacles 21, as shown in FIGS. 1 and 4. The passages 36 are separated by internal walls 37 that may have the same thicknesses as the internal walls 27 defining the corresponding receptacles 21. When the cover 30 is placed on the body 20, the passages 36 of the cover 30 are aligned with the receptacles 21, and a portion of each of the batteries or cells 15 is received in one of the passages 36. In this configuration, each receptacle 21 combines with one of the passages 36 to form a single, continuous, contiguous cavity that receives the battery or cell 15 therein. The receptacles 21 are thereby placed in communication with the head space 14 via the passages 36, as matter exiting the receptacle 21 passes through the respective corresponding passage 36 to enter the head space 14. FIG. 4 illustrates the shape of the head space 14 and the vent 40 in broken lines for clarity of disclosure. The total height of each such cavity (the receptacle 21 and the corresponding passage 36) is greater than the height of the battery or cell 15 contained therein, in one embodiment. Additionally, the height or thickness of the bottom portion 34 and the height of the passages 36 in FIGS. 1-5 are significantly smaller than the height of the receptacles 21 and the height of the internal walls 27 between the receptacles 21. In this configuration, the majority of the batteries or cells 15 are received in the receptacles 21, and a smaller upper portion of each battery or cell 15 is received in the corresponding passage 36. The relative heights of these components may vary in other embodiments. For example, FIG. 6 illustrates an embodiment where the height of the bottom portion 34 and the height of the passages 36 are at least as large the height of the receptacles 21 and the height of the internal walls 27 between the receptacles 21.

In one embodiment (not shown), the cover 30 and the body 20 may include mating features to enhance sealing and engagement between the cover 30 and the body 20, such as ridges, protrusions, notches, slots, recesses, or other interlocking features. Such features may be arranged around the peripheries of the cover 30 and the body 20 and/or between the receptacles 21. Additionally, the cover 30 may be held to the body 20 by fasteners or other structures (not shown). For example, screws may be used to hold the cover 30 and the body 20 together after loading of the batteries or cells 15.

Figure 5:
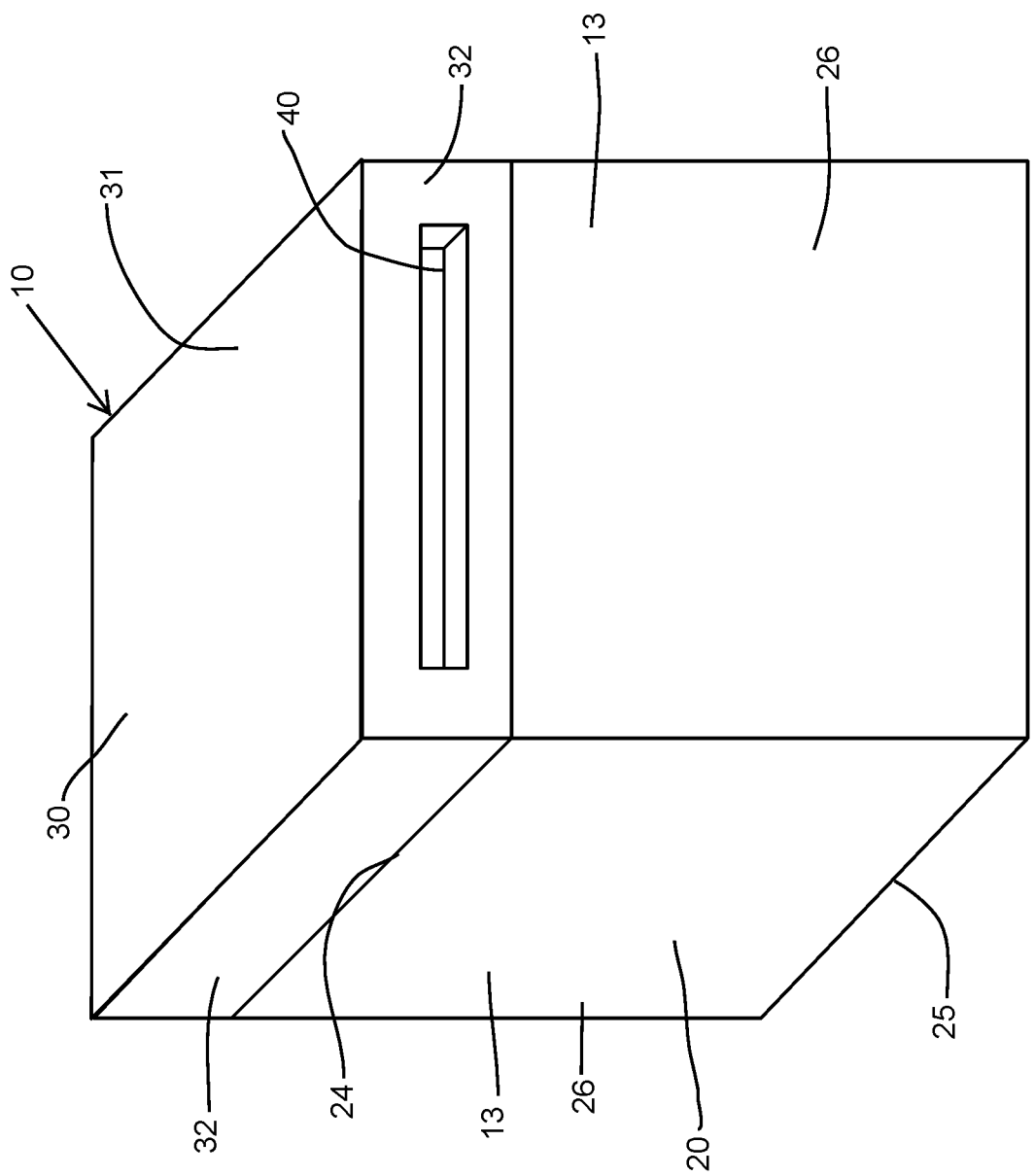
FIG. 5 is a top perspective view of the container of FIG. 1.
Figure 6:
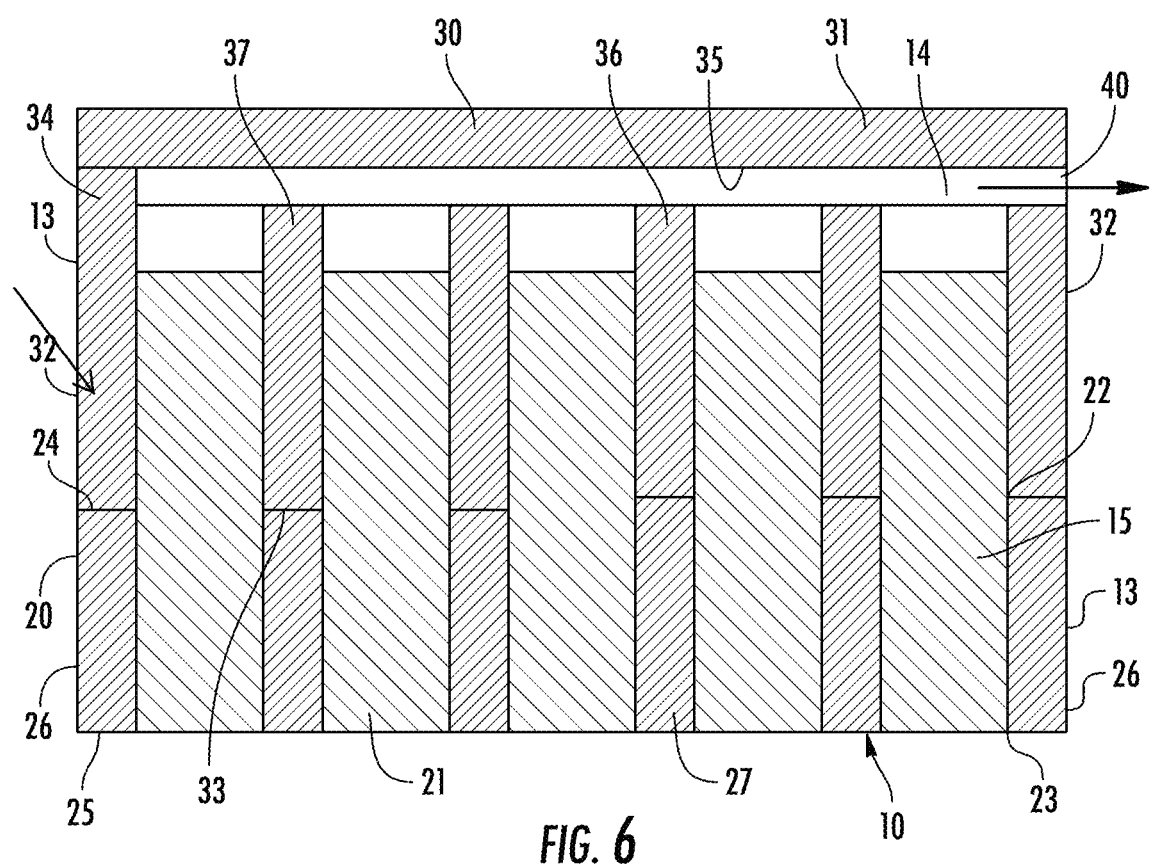
FIG. 6 is a cross-sectional view of another embodiment of a container according to aspects of the disclosure.

The container 10 in FIGS. 1-5 further includes a vent 40 in communication with the head space 14, such that gases and other matter entering the head space 14 may exit the container 10 through the vent 40. In this configuration, products of thermal runaway, such as gases, enter the head space 14 from the receptacle 21 and then exit the head space 14 through the vent 40. The container 10 in FIGS. 1-5 includes a single vent 40 extending through one side 13 of the container 10 only. Directing the vent 40 through only a single side 13 of the container 10 provides increased safety, by allowing vented gas and other matter to be accurately directed. The vent 40 in this embodiment is entirely defined by the cover 30, as seen in FIGS. 1 and 5, and is formed in a single wall 32 of the cover 30.

Figure 10:
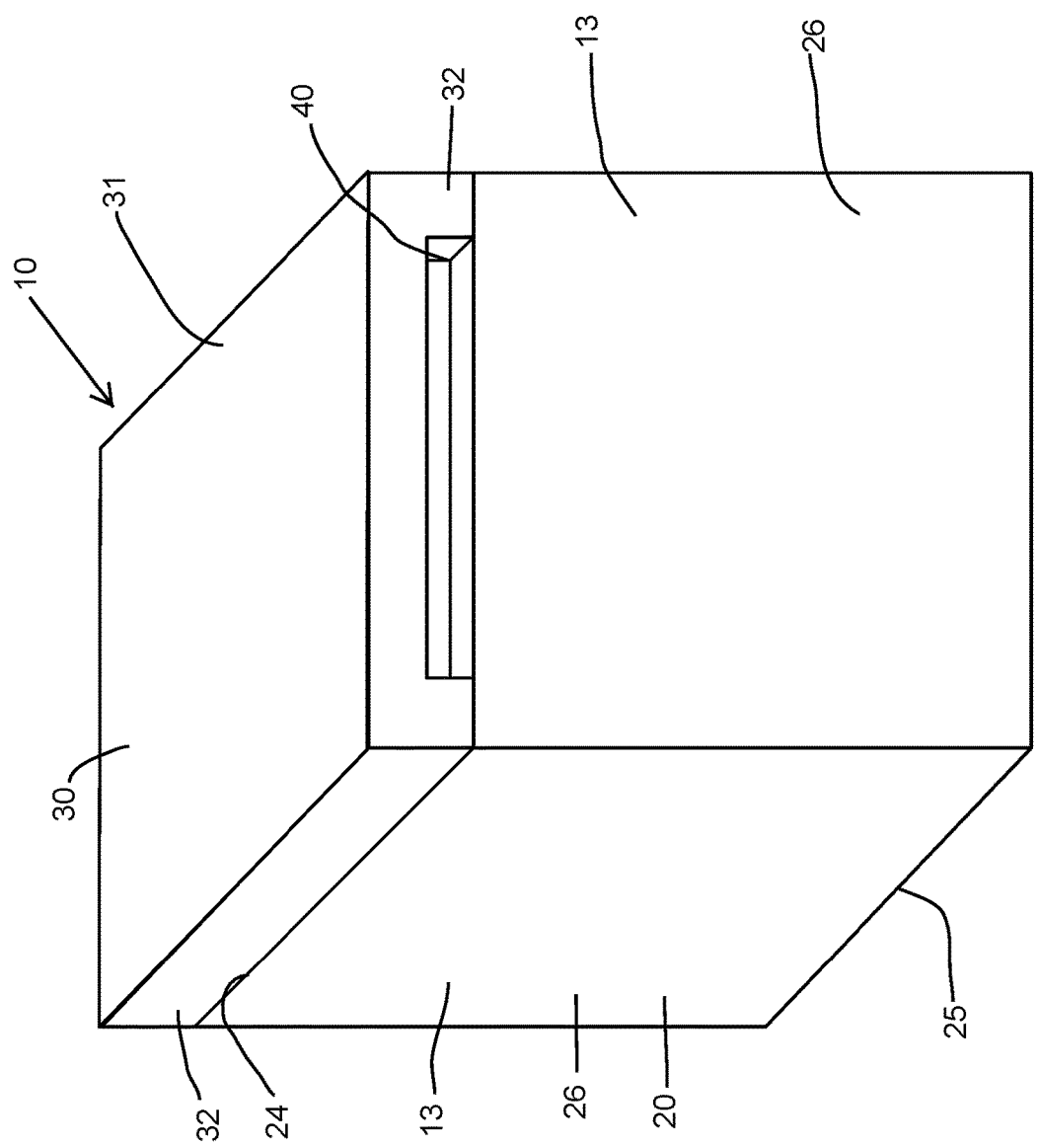
FIG. 10 is a top perspective view of another embodiment of a container according to aspects of the disclosure.
Figure 11:
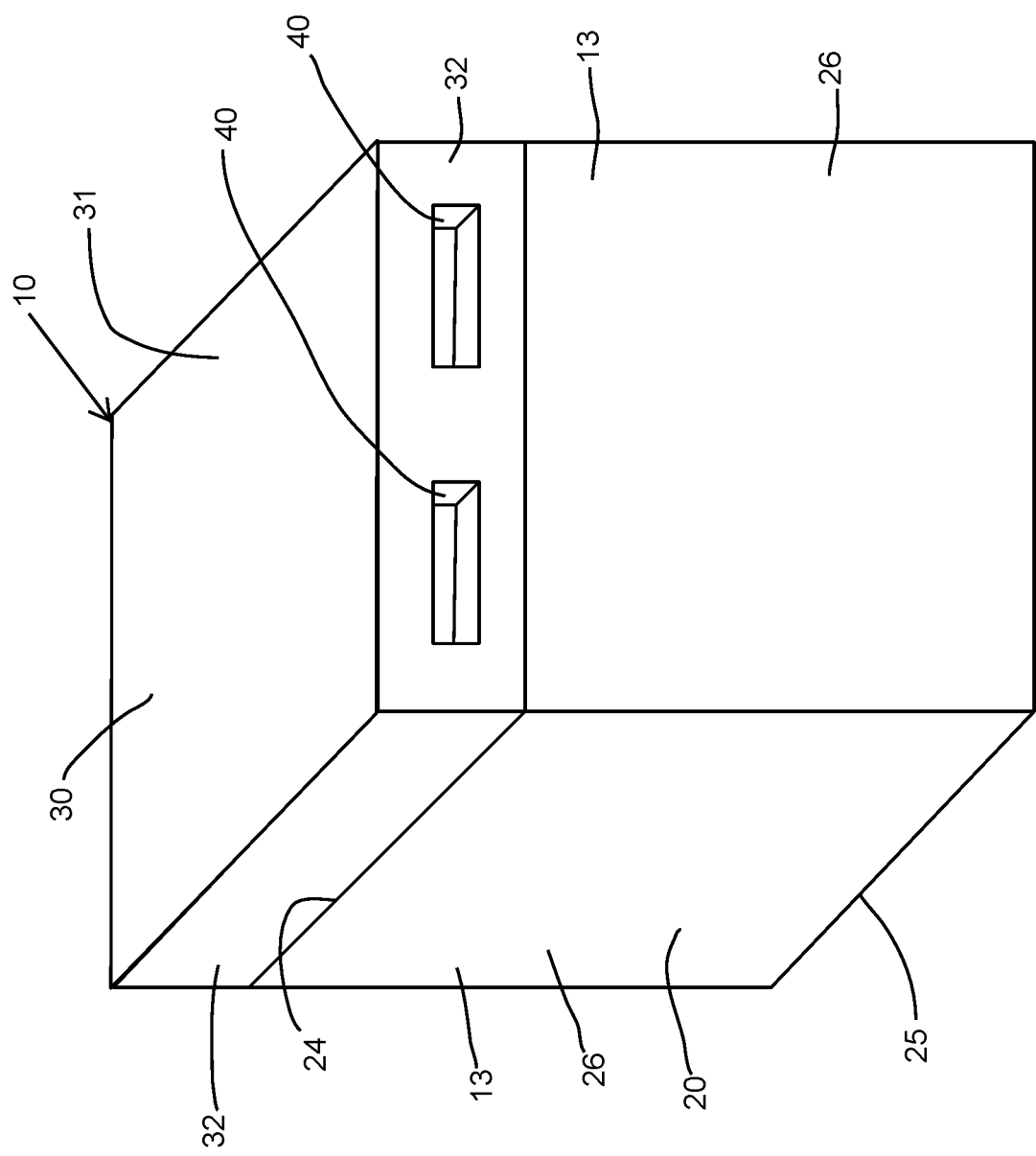
FIG. 11 is a top perspective view of another embodiment of a container according to aspects of the disclosure.

In another embodiment, the container 10 may include a vent 40 defined in part by the cover 30 and in part by the body 20, such as shown in FIG. 10, entirely by the body 20, or entirely by the cover 30, such as shown in FIG. 11. In another embodiment, the container 10 may include multiple vents 40 through a single side 13 of the container 10, such as shown in FIG. 11, or vents 40 in multiple sides 13 of the container 10.

The body 20 and/or the cover 30 may be made from materials that assist in avoiding thermal runaway propagation, such as by resisting damage to the container 10 and/or limiting heat transfer from one receptacle 21 to surrounding receptacles 21. The container 10 may be configured to maintain material integrity up to at least 300° C. during thermal runaway, and to ensure that the receptacles 21 surrounding the receptacle 21 in which thermal runaway is occurring may reach a temperature of no more than 100° C. In one embodiment, the material of the body 20 and/or the cover 30 may have a relatively high thermal conductivity, such as at least 0.6 W/m*K. In another embodiment, the material of the body 20 and/or the cover 30 may have intumescent properties, such that the material expands with increased temperature, e.g., as caused by thermal runaway, which may increase sealing capability between components of the body 20 or the seltzer 30. As a further embodiment, the material of the body 20 and/or the cover 30 may be or include a phase-change material that changes from a first phase to a second phase at a specific temperature and/or amount of heat input. As various examples, the material may be configured to change from a solid (e.g., paraffin wax) phase to a liquid phase, or from a liquid (e.g., water) phase to a gas phase, or from one solid phase to another solid phase (e.g., a dense solid to a foam or cellular material), or the reverse. The material may be configured to change phases such that in the second phase, the material's heat absorption capability increases. The material of the body 20 and/or the cover 30 may be a polymeric material in one embodiment, which term includes not only pure polymer materials, but also composite materials with the polymer material as a matrix. Different types of materials may be used instead of the polymeric material of the body 20 and the cover 30 in other embodiments.

In one embodiment, the body 20 and the cover 30, or at least the bottom portion 34 of the cover 30, may be made from the same material. The body 20 and/or the cover 30 may be made from a single, integral piece of material in one embodiment as well, e.g., by casting or injection molding. It is understood that the receptacles 21 may be formed by milling or machining, or other material removal techniques. For example, the body 20 shown in FIGS. 1-3 is formed of a single, integral piece of a polymer material that is injection molded and milled to create the receptacles 21. The cover 30, or the bottom portion 34 thereof, may be made in a similar manner. Forming the cover 30 and the body 20 out of the same material provides numerous benefits, including enhancing protective properties and providing similar thermal expansion rates. For example, the cover 30 and the body 20 being formed of the same material can avoid the danger of any chemical reaction between the materials of the cover 30 and the body 20 and/or avoid the creation of a corrosion potential between the cover 30 and the body 20. As another example, the cover 30 and the body 20 having similar thermal expansion rates helps to avoid gaps or spaces that may form between the cover 30 and the body 20 during thermal expansion or contraction. The benefit of having similar thermal expansion rates also reduces design complexities as well as the cost of materials and manufacturing.

Figure 9:
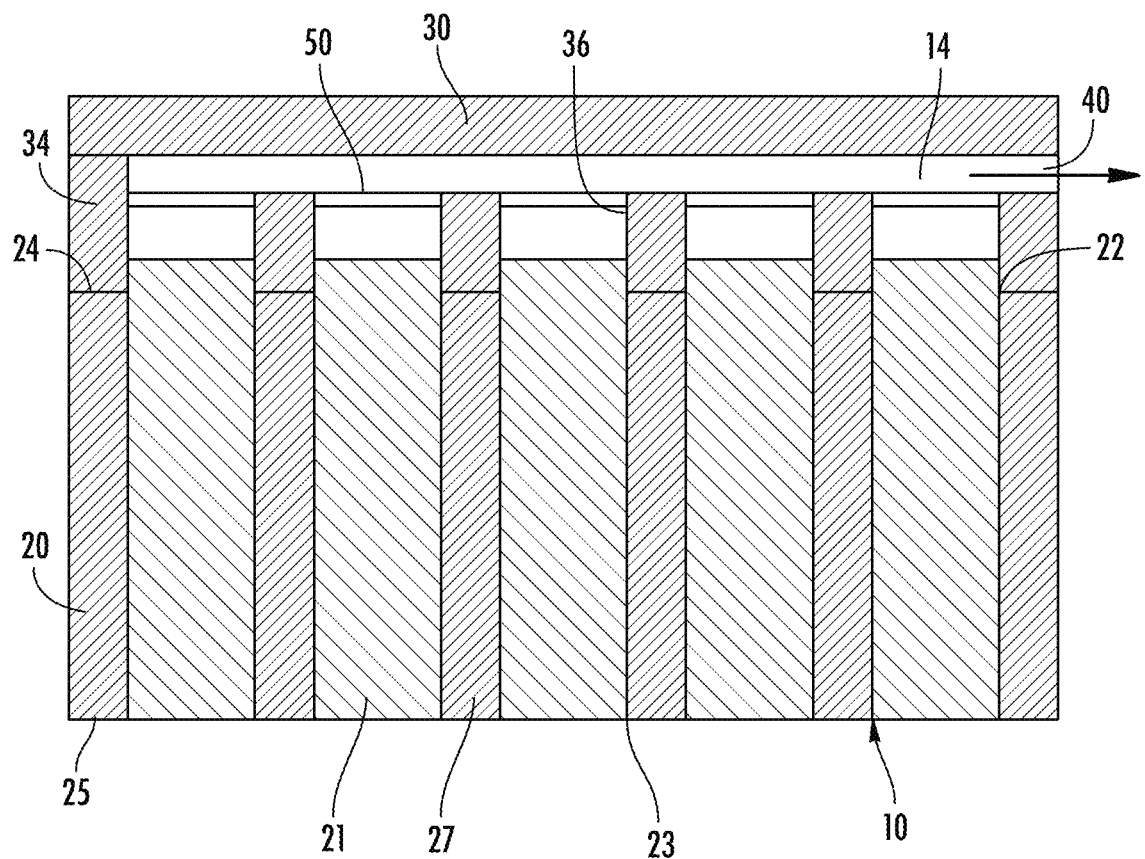
FIG. 9 is a cross-sectional view of another embodiment of a container according to aspects of the disclosure.

In one embodiment, the container 10 may further include a plurality of seals 50 positioned between the receptacles 21 and the head space 14. The seals 50 may be connected to the body 20 or the cover 30 in various embodiments to seal the receptacles 21 from the head space 14. FIG. 9 illustrates one such embodiment, where the seals 50 are connected to the bottom portion 34 of the cover 30 and seal the passages 36, thereby effectively sealing the receptacles 21 from the head space 14. The seals 50 may be configured to permit selective escape of matter from one receptacle while resisting the matter from infiltrating other receptacles, such as by being breakable and/or selectively permeable in various embodiments. For example, breakable seals 50 may be used in one embodiment to permit escape of gases and other matter from a receptacle 21 based on increased heat and/or pressure, but the seals 50 covering the other receptacles 21 do not permit the matter to enter the other receptacles 21. The seals 50 may be made to be breakable by being formed of a weak or frangible material, by being formed of a thermally sensitive material, or by deliberate weakening, e.g., scoring, among other techniques. In one embodiment, each seal 50 may be an individual rupture disk. As another example, selectively permeable seals 50 may be used to selectively control movement of matter through the seals 50, such as by direction of movement, material identity, etc. Such selective permeability may include one-way permeability, i.e., permitting passage of matter upward through the seal 50 and out of the receptacle 21 but not in the direction into the receptacle 21. Such selective permeability may also include matter-specific permeability, i.e., permitting passage of certain matter through the seal 50 and resisting passage of other matter through the seal 50. For example, matter-specific permeability may permit passage of gases, but not solids or liquids, in one embodiment. A microporous filter may be used to form a selectively permeable seal 50 in one embodiment. Other types of seals 50 may be used in other embodiments.

FIG. 6 illustrates another embodiment of a container 10 in which the bottom portion 34 of the cover 30 has a greater height as compared to the cover 30 in the embodiment of FIGS. 1-5. In this configuration, the height or thickness of the bottom portion 34 and the height of the passages 36 are greater than the height of the receptacles 21 and the height of the internal walls 27 between the receptacles 21. At least half of the battery or cell 15 is received in the passage 36 in this embodiment. The container 10 in FIG. 6 is otherwise identical to the container 10 in FIGS. 1-5. It is understood that a similar configuration may be used in connection with other containers 10 having different bodies 20 and/or covers 30.

Figure 7:
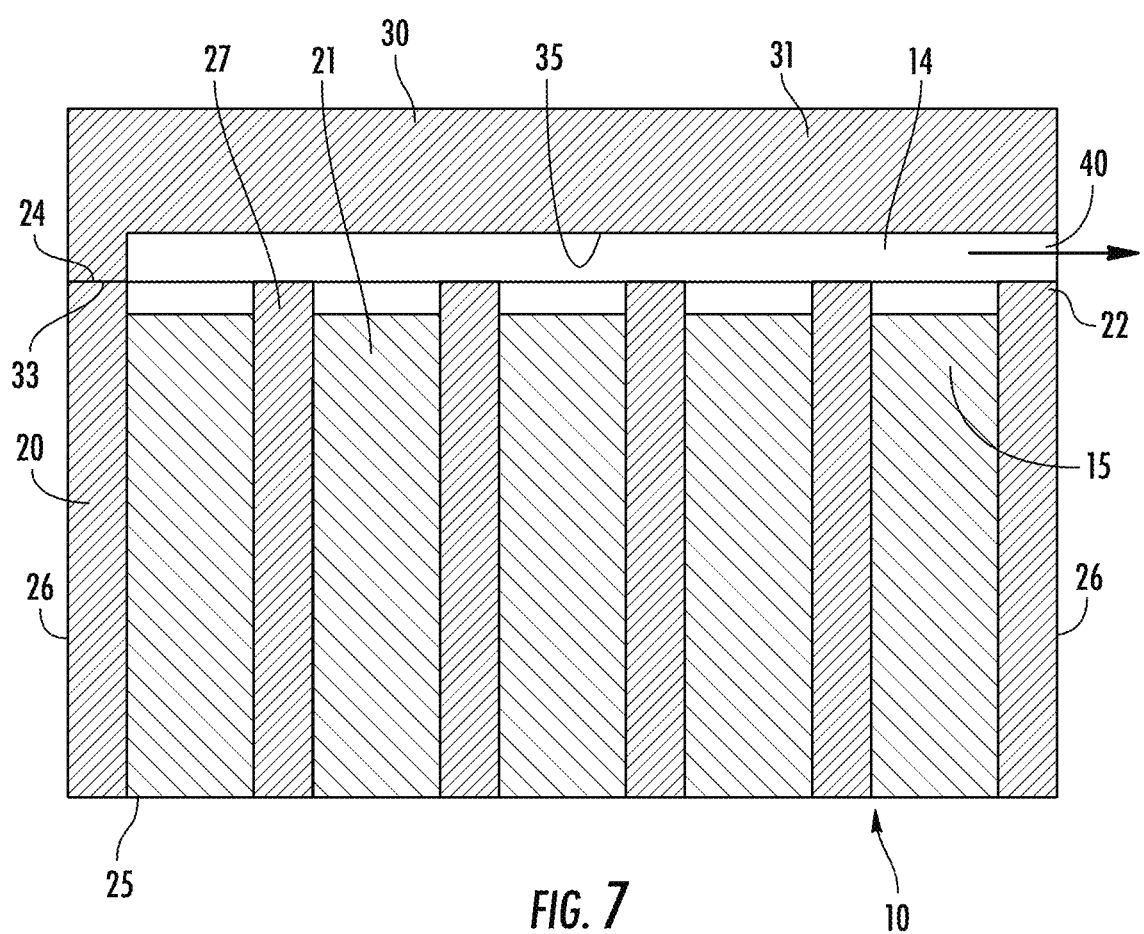
FIG. 7 is a side view of another embodiment of a container according to aspects of the disclosure.

FIG. 7 illustrates another embodiment of a container 10 in which the cover 30 has no bottom portion 34 with passages 36, and the batteries or cells 15 are entirely received in the receptacles 21. The internal structure in this embodiment is indicated by broken lines. The container 10 in FIG. 7 is otherwise identical to the container 10 in FIGS. 1-5. It is understood that a similar configuration may be used in connection with other containers 10 having different bodies 20 and/or covers 30.

FIG. 8 illustrates another embodiment of a container 10 in which the second ends 23 of the receptacles 21 are closed ends that terminate within the body 20, but which is otherwise identical to the container 10 of FIGS. 1-5. It is understood that a similar configuration may be used in connection with other containers 10 having different bodies 20 and/or covers 30.

FIG. 10 illustrates another embodiment of a container 10 in which the vent 40 is defined in part by one of the walls 32 of the cover 30 and in part by the top 24 of the body 20, but which is otherwise identical to the container 10 of FIGS. 1-5. It is understood that a similar configuration may be used in connection with other containers 10 having different bodies 20 and/or covers 30.

FIG. 11 illustrates another embodiment of a container 10 in which two vents 40 are formed in the side 13 of the container 10, through a single wall 32 of the cover. The container 10 in FIG. 11 is otherwise identical to the container 10 of FIGS. 1-5. In another embodiment, the two vents 40 in FIG. 11 may be in communication with two separate head spaces 14, as disclosed herein. It is understood that a similar configuration may be used in connection with other containers 10 having different bodies 20 and/or covers 30. Additionally, in other embodiments, the number of vents 40 may be increased depending on factors such as the size of the container 10, the number of receptacles 21, the number of head spaces 14, etc.

Figure 13:
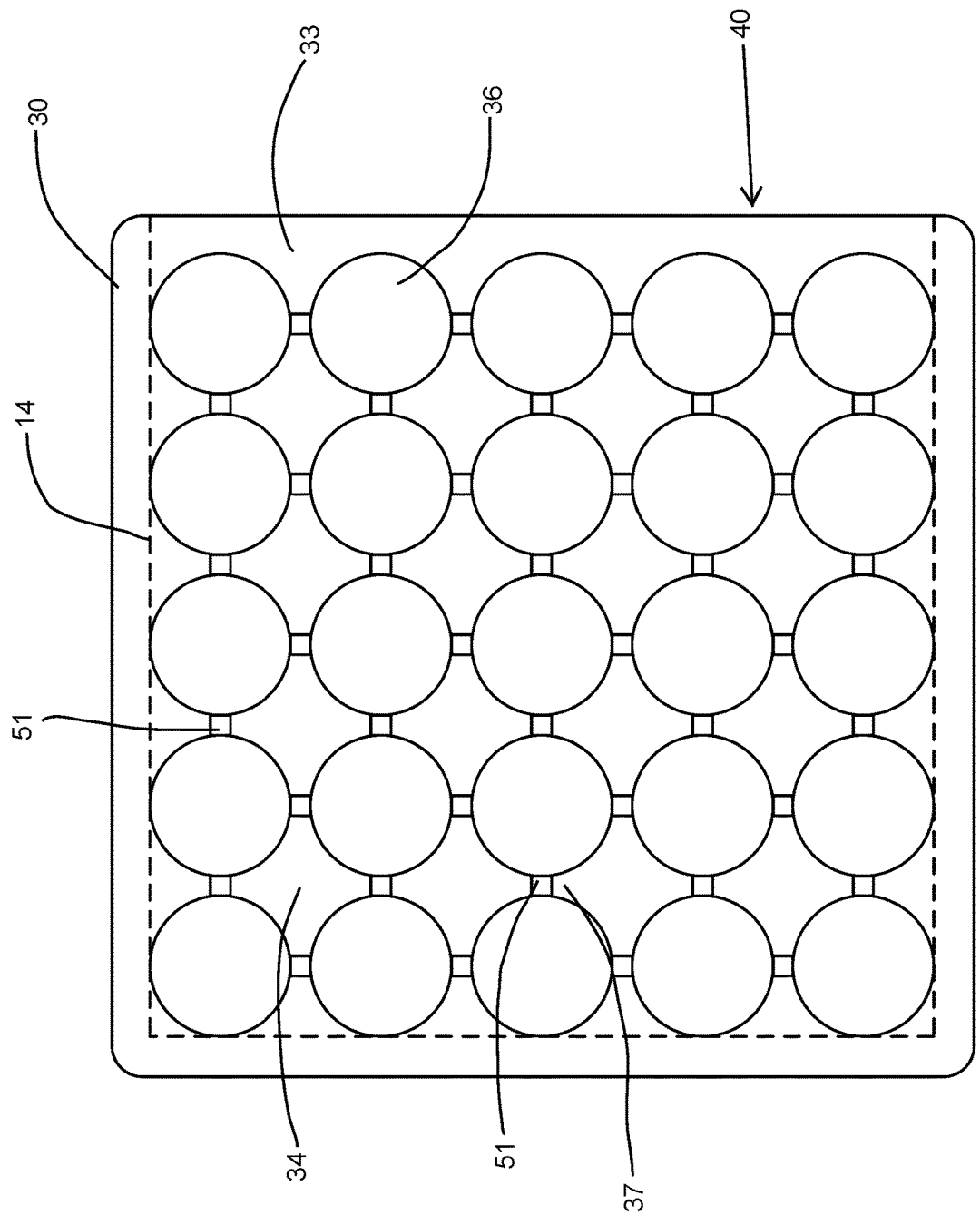
FIG. 13 is a bottom view of another embodiment of a cover for a container according to aspects of the disclosure.
Figure 19:
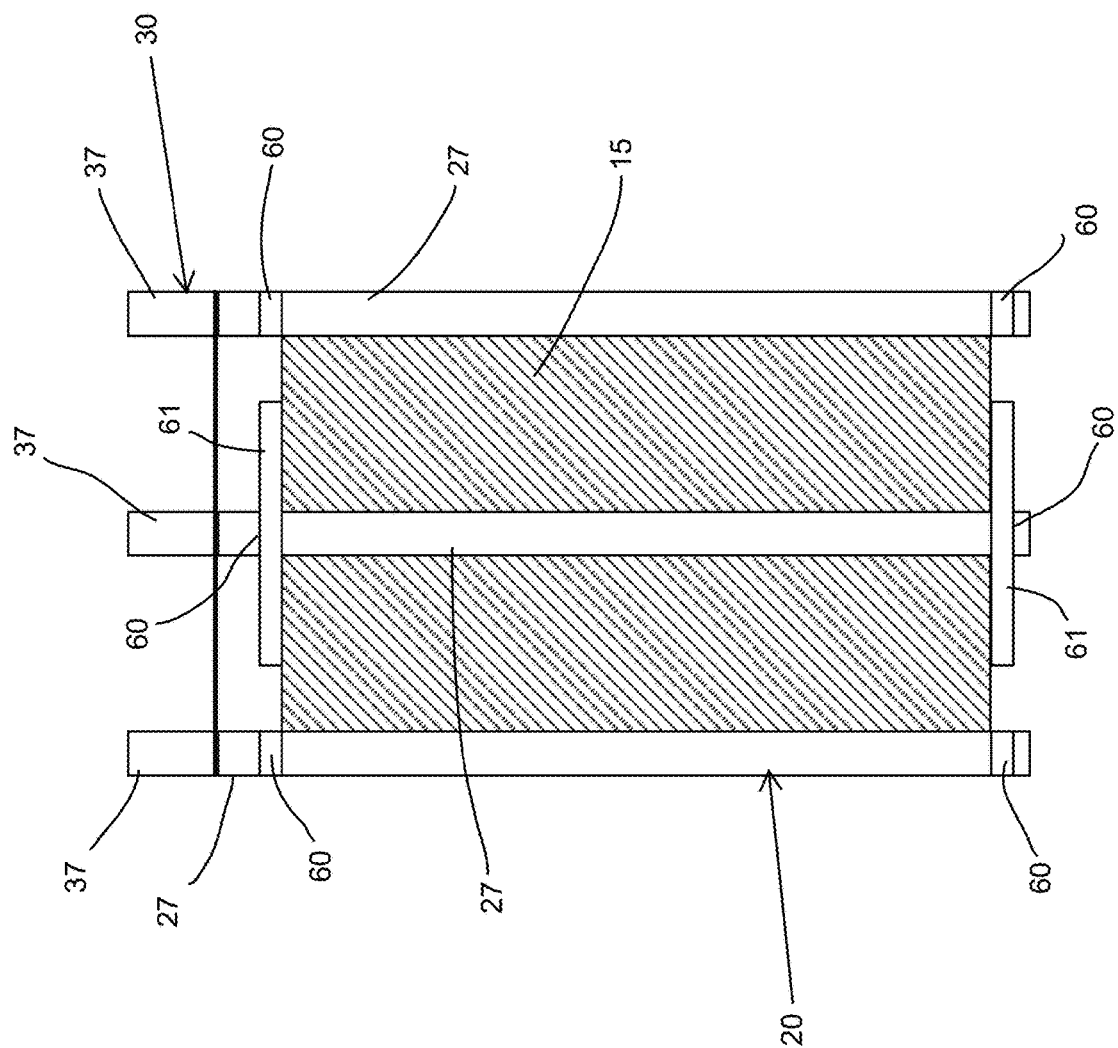
FIG. 19 is a cross-sectional view of a portion of another embodiment of a container according to aspects of the disclosure.

FIG. 13 illustrates another embodiment of a cover 30 for a container 10 that includes slots 60 interconnecting at least some of the receptacles 21 to permit passage of electrical interconnect tabs between the receptacles 21. These slots 60 may be sized approximately the same as the electrical interconnect tabs to avoid the presence of airgaps between the receptacles 21 through which gases, vapors, heat, etc., could flow from one receptacle 21 to the next, in one embodiment. The slots 60 may be provided on the bottom side 33 of the bottom portion 34, on the top side of the bottom portion 34, or through the bottom portion (i.e., through the internal walls 37), in various embodiments. In other embodiments, the slots 60 may additionally or alternately be provided in the body 20, such as on the top 24, on the bottom 25, or through the internal walls 27. In one embodiment, slots 60 may be provided proximate the tops of the batteries or cells 15, e.g., in the cover 30, as well as proximate the bottoms of the batteries or cells 15, e.g., near the bottom 25 of the body 20, to permit electrical interconnection at the tops and bottoms of the batteries or cells 15. FIGS. 17-19, described herein, illustrate different locations of the slots 60 that may be used in various embodiments, with electrical interconnect tabs 61 shown extending between batteries or cells 15 in adjacent receptacles 21. It is understood that the configuration and placement of the slots 60 may be designed for a specific interconnect pattern, and not all receptacles 21 may be connected to all adjacent receptacles 21 as in FIG. 13. The cover 30 in FIG. 13 is otherwise identical to the cover 30 of FIGS. 1-5. It is also understood that a similar configuration may be used in connection with other containers 10 having different bodies 20 and/or covers 30.

FIG. 17 illustrates an embodiment where slots 60 are provided at the tops of the receptacles 21 by passages extending through the walls 37 of the cover 30, and additional slots 60 are provided at the bottoms of the receptacles 21 by recesses in the bottoms of the walls 27 of the body 20. FIG. 18 illustrates an embodiment where slots 60 are provided at the tops of the receptacles 21 by recesses in the tops of the walls 27 of the body 20, and additional slots 60 are provided at the bottoms of the receptacles 21 by one or more recesses in the top of the bottom wall 62 of the body 20 (e.g., as shown in FIG. 8). It is understood that the slots 60 may alternately be provided at the tops of the receptacles 21 by recesses in the bottoms of the walls 37 of the cover 30. FIG. 19 illustrates an embodiment where slots 60 are provided at the tops and the bottoms of the receptacles 21 by passages extending through the walls 27 of the body 20. It is understood that various additional embodiments described herein may have different combinations of the slots 60 at the tops of the receptacles 21 and the slots 60 at the bottoms of the receptacles 21 as shown in FIGS. 17-19, such as a combination of the top slots 60 of FIG. 17 and the bottom slots 60 of FIG. 18. It is also understood that containers 10 that include one or more inserts 29, e.g., as shown in FIGS. 14-16, may include slots 60 through walls 27 of the insert(s) 29.

Various embodiments of containers and components for such containers have been described herein, which include various components and features. In other embodiments, the containers and components thereof may be provided with any combination of such components and features. It is also understood that in other embodiments, the various devices, components, and features of the containers and components thereof described herein may be constructed with similar structural and functional elements having different configurations, including different ornamental appearances.

The containers described herein provide benefits not provided by existing containers for holding batteries or cells. For example, the design of the containers avoids propagation of thermal runaway, increasing safety and product integrity. In fact, the containers described herein may even permit storage and transportation of multiple batteries or cells at higher states of charge (potentially up to 100% charge). As another example, the design of the containers allows any harmful matter, such as gases and/or smoke resulting from thermal runaway, to be directed in a desired direction, also increasing safety and improving transportation capability. Such a benefit may be particularly advantageous for aircraft, as well as other means of transportation, e.g., ships and trucks. The structures of the containers described herein can further be used in the design of safer batteries or cells for various applications. Still further benefits and advantages are recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "top," "bottom," "side," and the like, as used herein, are intended for illustrative purposes only and do not limit the embodiments in any way. Nothing in this specification should be construed as requiring a specific three dimensional orientation of structures in order to fall within the scope of this invention, unless explicitly specified by the claims. When used in description of a method or process, the term "providing" (or variations thereof) as used herein means generally making an article available for further actions, and does not imply that the entity "providing" the article manufactured, assembled, or otherwise produced the article. Additionally, the term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A container comprising:
a body having a top and a bottom;
a plurality of receptacles defined within the body, each receptacle being configured to receive an electrochemical cell or battery therein, each receptacle having a first end and a second end and extending vertically between the first and second ends, wherein the first end is located at the top of the body and is open to receive insertion of the cell or battery, and wherein the body further comprises a plurality of internal walls separating the receptacles laterally from each other;
a cover removably positioned to cover the top of the body, such that the cover and the body together define a plurality of sides extending between a top wall of the cover and the bottom of the body, wherein a head space is defined beneath an underside of the top wall of the cover and above the first ends of the plurality of receptacles, and wherein the body and the cover are formed of a same material;
a vent extending through a first side of the plurality of sides, wherein the vent is in communication with the head space to permit gases within the head space to exit through the vent; and
a plurality of seals positioned below the head space to cover the plurality of receptacles and to seal the plurality of receptacles from the head space, wherein the plurality of seals are configured to permit selective escape of gaseous matter from one receptacle while resisting solid matter from infiltrating other receptacles.

2. The container of claim 1, wherein the material of the cover and the body is a polymeric material having a thermal conductivity of at least 0.6 W/m*K.

3. The container of claim 1, wherein the cover and the body are each formed from a single, integral piece of the material.

4. The container of claim 1, wherein the cover further comprises a side wall depending from the top wall and a bottom portion connected to the side wall and extending below the top wall, such that the bottom portion is spaced from the underside of the top wall to define the head space between the top wall and the bottom portion, the bottom portion having a plurality of passages extending vertically through the bottom portion to the head space, wherein the plurality of passages of the cover are positioned above the plurality of receptacles, such that the receptacles combine with the passages to define a plurality of continuous cavities, and a portion of each cell or battery is configured to be received in one of the passages, and wherein the head space is defined above the plurality of passages, such that the head space is in communication with the plurality of receptacles via the plurality of passages.

5. The container of claim 4, wherein the plurality of seals are connected to the cover and seal the plurality of passages from the head space to thereby seal the plurality of receptacles from the head space.

6. The container of claim 1, wherein each of the plurality of receptacles extends to the bottom of the body, such that the second end of each receptacle is open.

7. The container of claim 1, wherein the second end of each of the plurality of receptacles is a closed end located within the body.

8. The container of claim 1, wherein the cover and the body together define a rectangular shape having the first side, a second side, a third side, and a fourth side, and wherein the head space is closed on the second side, the third side, and the fourth side.

9. A container comprising:
a body having a top and a bottom;
a cover removably positioned to cover the top of the body, such that the cover and the body together define a plurality of sides extending between a top wall of the cover and the bottom of the body, wherein the cover further comprises a side wall depending from the top wall and a bottom portion connected to the side wall and extending below the top wall, such that the bottom portion is spaced from an underside of the top wall to define a head space between the top wall and the bottom portion, the bottom portion having a plurality of passages extending vertically through the bottom portion to the head space;
a plurality of receptacles defined within the body, each receptacle being configured to receive an electrochemical cell or battery therein, each receptacle having a first end and a second end and extending vertically between the first and second ends, wherein the first end is located at the top of the body and is open to receive insertion of the cell or battery, wherein the body further comprises a plurality of internal walls separating the receptacles laterally from each other, and wherein the plurality of passages of the cover are positioned above the plurality of receptacles and are continuous with the receptacles to define a plurality of continuous cavities, such that a portion of each cell or battery is configured to be received in one of the passages, and the head space is in communication with the plurality of receptacles via the plurality of passages;
a vent extending through a first side of the plurality of sides, wherein the vent is in communication with the head space to permit gases within the head space to exit through the vent; and
a plurality of seals positioned below the head space to cover the plurality of receptacles and to seal the plurality of receptacles from the head space, wherein the plurality of seals are configured to permit selective escape of gaseous matter from one receptacle while resisting solid matter from infiltrating other receptacles.

10. The container of claim 9, wherein the bottom portion of the cover engages the top of the body to separate the receptacles and passages from each other.

11. The container of claim 9, wherein the plurality of passages and the plurality of receptacles have cross-sectional shapes and cross-sectional sizes that are the same.

12. The container of claim 9, wherein the vent is defined entirely within a wall of the cover and is located above the bottom portion of the cover.

13. The container of claim 9, wherein a height of the cover from the bottom portion to the top wall is greater than a height of the body from the bottom to the top, and the plurality of passages have greater heights than the plurality of receptacles.

14. The container of claim 9, wherein the cover and the body together define a rectangular shape having the first side, a second side, a third side, and a fourth side, and wherein the head space is closed on the second side, the third side, and the fourth side.

15. The container of claim 9, wherein the plurality of seals are connected to the bottom portion of the cover at or below top ends of the passages to seal the plurality of passages and to thereby seal the plurality of receptacles from the head space.

16. The container of claim 9, wherein a plurality of slots are provided in at least one of the bottom portion of the cover and the body, wherein the slots are configured to interconnect the cells or batteries in adjacent receptacles.

17. A container comprising:
a body having a top and a bottom;
a plurality of receptacles defined within the body, each receptacle being configured to receive an electrochemical cell or battery therein, each receptacle having a first end and a second end and extending vertically between the first and second ends, wherein the first end is located at the top of the body and is open to receive insertion of the cell or battery, and wherein the body further comprises a plurality of internal walls separating the receptacles laterally from each other;
a cover removably positioned to cover the top of the body, such that the cover and the body together define a plurality of sides extending between a top wall of the cover and the bottom of the body, wherein a head space is defined beneath an underside of the cover and above the first ends of the plurality of receptacles;
a vent extending through a first side of the plurality of sides, wherein the vent is in communication with the head space to permit gases within the head space to exit through the vent; and
a plurality of seals positioned below the head space to cover the plurality of receptacles and to seal the plurality of receptacles from the head space, wherein the plurality of seals are configured to permit selective escape of gaseous matter from one receptacle while resisting solid matter from infiltrating other receptacles.

18. The container of claim 17, wherein the cover further comprises a side wall depending from the top wall and a bottom portion connected to the side wall and extending below the top wall, such that the bottom portion is spaced from the underside of the top wall to define the head space between the top wall and the bottom portion, the bottom portion having a plurality of passages extending vertically through the bottom portion to the head space, wherein the plurality of passages of the cover are positioned above the plurality of receptacles, such that the receptacles combine with the passages to define a plurality of continuous cavities, and a portion of each cell or battery is configured to be received in one of the passages, and wherein the head space is defined above the plurality of passages, such that the head space is in communication with the plurality of receptacles via the plurality of passages.

19. The container of claim 18, wherein the plurality of seals are connected to the cover and seal the plurality of passages from the head space, to thereby seal the plurality of receptacles from the head space.

20. The container of claim 17, wherein the cover and the body together define a rectangular shape having the first side, a second side, a third side, and a fourth side, and wherein the head space is closed on the second side, the third side, and the fourth side.

21. The container of claim 17, wherein each of the plurality of receptacles extends to the bottom of the body, such that the second end of each receptacle is open.

22. The container of claim 17, wherein the second end of each of the plurality of receptacles is a closed end located within the body.

23. The container of claim 17, wherein the body and the cover are formed of a polymeric material having a thermal conductivity of at least 0.6 W/m*K.

24. The container of claim 1, wherein the plurality of seals are connected to the body and are positioned at or below the first ends of the receptacles to seal the plurality of receptacles from the head space.

25. The container of claim 9, wherein the plurality of seals are connected to the body and are positioned at or below the first ends of the receptacles to seal the plurality of receptacles from the head space.

26. The container of claim 17, wherein the plurality of seals are connected to the body and are positioned at or below the first ends of the receptacles to seal the plurality of receptacles from the head space.

27. The container of claim 1, wherein the plurality of seals are configured to permit selective escape of the gaseous matter from one receptacle while resisting the solid matter from infiltrating other receptacles by being breakable and/or selectively permeable.

28. The container of claim 1, wherein the plurality of seals includes a first seal covering and sealing a first receptacle of the plurality of receptacles, and the plurality of seals are breakable such that the first seal is configured to break to permit selective escape of the gaseous matter from the first receptacle, and other seals of the plurality of seals are configured to resist the solid matter from infiltrating other receptacles of the plurality of receptacles.

29. The container of claim 1, wherein the plurality of seals includes a first seal covering and sealing a first receptacle of the plurality of receptacles, and the plurality of seals are selectively permeable such that the first seal is configured to permit selective escape of the gaseous matter from the first receptacle through the head space and out of the container through the vent, while resisting the solid matter from escaping from the first receptacle and infiltrating other receptacles of the plurality of receptacles.

* * * * *